United States Patent
Yang et al.

(10) Patent No.: US 9,629,148 B2
(45) Date of Patent: Apr. 18, 2017

(54) METHOD FOR SIGNALING CONTROL INFORMATION, AND APPARATUS THEREOF

(71) Applicant: LG ELECTRONICS INC., Seoul (KR)

(72) Inventors: Suckchel Yang, Anyang-si (KR); Joonkui Ahn, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/192,667

(22) Filed: Jun. 24, 2016

(65) Prior Publication Data

US 2016/0309351 A1 Oct. 20, 2016

Related U.S. Application Data

(63) Continuation of application No. 14/416,940, filed as application No. PCT/KR2013/006958 on Aug. 1, 2013, now Pat. No. 9,402,253.

(Continued)

(51) Int. Cl.
*H04W 24/04* (2009.01)
*H04W 72/04* (2009.01)
(Continued)

(52) U.S. Cl.
CPC ......... *H04W 72/042* (2013.01); *H04L 1/0076* (2013.01); *H04L 1/1671* (2013.01);
(Continued)

(58) Field of Classification Search
None
See application file for complete search history.

(56) References Cited

U.S. PATENT DOCUMENTS 9,060,357 B2  6/2015  Ji et al.
9,402,253 B2 * 7/2016  Yang .................... H04L 1/0076
(Continued)

FOREIGN PATENT DOCUMENTS

KR   10-2006-0100451 A   9/2006
KR   10-2011-0081954 A   7/2011
(Continued)

OTHER PUBLICATIONS

NEC Group, "Support of different TDD UL-DL configurations on different bands," 3GPP TSG RAN WG1 Meeting #68bis, R1-121328, Jeju, South Korea, Mar. 26-30, 2012, 7 pgs.

(Continued)

*Primary Examiner* — Brian Roberts
(74) *Attorney, Agent, or Firm* — Birch, Stewart, Kolasch & Birch, LLP

(57) ABSTRACT

A method is provided for transmitting and receiving at least one of control information and a response signal at a user equipment (UE) in a carrier aggregation based wireless communication system. A first cell group having a primary cell (PCell) is configured. A second cell group having one or more secondary cells (SCells) is configured. A procedure of transmitting and receiving at least one of specific cell-related control information and a response signal is performed. If the first cell group and the second cell group are managed by a same base station, at least one of the control information and the response signal is transmitted and received on the first cell group or the second cell group. If the first cell group and the second cell group are managed by different base stations, at least one of the control information and the response signal is transmitted and received only on one of the first cell group or the second cell group according to control information type.

8 Claims, 15 Drawing Sheets

Related U.S. Application Data

(60) Provisional application No. 61/822,310, filed on May 11, 2013, provisional application No. 61/807,785, filed on Apr. 3, 2013, provisional application No. 61/750,306, filed on Jan. 8, 2013, provisional application No. 61/678,600, filed on Aug. 1, 2012.

(51) Int. Cl.
| | | |
|---|---|---|
| *H04L 1/00* | (2006.01) | |
| *H04L 1/18* | (2006.01) | |
| *H04L 1/16* | (2006.01) | |
| *H04L 5/00* | (2006.01) | |

(52) U.S. Cl.
CPC .......... *H04L 1/1812* (2013.01); *H04L 5/0032* (2013.01); *H04L 5/0055* (2013.01); *H04W 24/04* (2013.01); *H04W 72/0413* (2013.01)

(56) References Cited

U.S. PATENT DOCUMENTS

| | | |
|---|---|---|
| 2005/0143118 A1 | 6/2005 | Bernhardsson et al. |
| 2011/0249641 A1 | 10/2011 | Kwon et al. |
| 2011/0281612 A1 | 11/2011 | Ishii et al. |
| 2012/0135741 A1 | 5/2012 | Zhou et al. |
| 2012/0257513 A1 | 10/2012 | Yamada |
| 2012/0263147 A1 | 10/2012 | Takahashi et al. |
| 2013/0003668 A1* | 1/2013 | Xiao ................ H04L 5/001 370/329 |
| 2013/0286883 A1 | 10/2013 | Kim et al. |
| 2013/0301433 A1 | 11/2013 | Yin et al. |
| 2013/0308550 A1 | 11/2013 | Yin et al. |
| 2014/0192775 A1 | 7/2014 | Li et al. |
| 2015/0098441 A1 | 4/2015 | Peng |
| 2015/0358924 A1 | 12/2015 | Papasakellariou |

FOREIGN PATENT DOCUMENTS

| | | |
|---|---|---|
| KR | 10-2012-0081033 A | 7/2012 |
| KR | 10-2012-0083863 A | 7/2012 |
| WO | WO 2012/094151 A2 | 7/2012 |

OTHER PUBLICATIONS

NTT DOCOMO, "PDSCH HARQ Timing of SCell and PUCCH Collision for Cross-Carrier Scheduling," 3GPP TSG RAN WG1 Meeting #69, R1-121972, Prague, Czech Republic, May 21-25, 2012, pp. 1-4.

Samsung, "Cross-carrier scheduling of PUSCH for TDD CA," 3GPP TSG RAN WG1 #68, R1-120160, Dresden, Germany, Feb. 6-10, 2012, pp. 1-3.

Renesas Mobile Europe, "Multiple Timing Advance Using Multiple RACH," 3GPP TSG-RAN WG2 Meeting #74, R2-113014, Barcelona, Spain, May 9-13, 2011, 3 pages.

* cited by examiner

\* Signaling path may be restricted to CC1 (group)
or CC2 (group) according to signaling type

METHOD FOR SIGNALING CONTROL INFORMATION, AND APPARATUS THEREOF

CROSS-REFERENCE TO RELATED APPLICATIONS

This application is a Continuation of co-pending U.S. patent application Ser. No. 14/416,940 filed on Jan. 23, 2015, which is filed as the National Phase of PCT/KR2013/006958 filed on Aug. 1, 2013, which claims the benefit under 35 U.S.C. §119(e) to U.S. Provisional Application No. 61/822,310 filed on May 11, 2013, 61/807,785 filed on Apr. 3, 2013, 61/750,306 filed on Jan. 8, 2013 and 61/678,600 filed on Aug. 1, 2012, all of which are hereby expressly incorporated by reference into the present application.

BACKGROUND OF THE INVENTION

The present invention relates to a wireless communication system and, more particularly, to a method for signaling control information and an apparatus therefor.

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

SUMMARY OF THE INVENTION

An object of the present invention devised to solve the problem lies in a method for efficiently transmitting and receiving control information in a wireless communication system and an apparatus therefor. More specifically, an object of the present invention is to provide a method for efficiently transmitting and receiving control information inter-site carrier aggregation (CA).

The technical problems solved by the present invention are not limited to the above technical problems and other technical problems which are not described herein will become apparent to those skilled in the art from the following description.

The object of the present invention can be achieved by providing a method for transmitting and receiving at least one of control information and a response signal at a user equipment (UE) in a carrier aggregation based wireless communication system including configuring a first cell group having a primary cell (PCell), configuring a second cell group having one or more secondary cells (SCells), performing a procedure of transmitting and receiving at least one of specific cell-related control information and a response signal, wherein, if the first cell group and the second cell group are managed by the same base station, at least one of the control information and the response signal is transmitted and received on the first cell group or the second cell group, and wherein, if the first cell group and the second cell group are managed by different base stations, at least one of the control information and the response signal is transmitted and received only on one of the first cell group or the second cell group according to control information type.

In another aspect of the present invention, provided herein is a user equipment (UE) configured to transmit and receive at least one of control information and a response signal in a carrier aggregation based wireless communication system including a radio frequency (RF) unit and a processor, wherein the processor is configured to configure a first cell group having a primary cell (PCell), to configure a second cell group having one or more secondary cells (SCells) and to perform a procedure of transmitting and receiving at least one of specific cell-related control information and a response signal, wherein, if the first cell group and the second cell group are managed by the same base station, at least one of the control information and the response signal is transmitted and received on the first cell group or the second cell group, and wherein, if the first cell group and the second cell group are managed by different base stations, at least one of the control information and the response signal is transmitted and received only on one of the first cell group or the second cell group according to control information type.

The first cell group and the second cell group may be managed by different base stations and the control information may include at least one of radio resource control (RRC) configuration/reconfiguration related information, radio link monitoring (RLM) related information, radio resource management (RRM) related information and handover related information.

At least one of the control information and the response signal may be transmitted and received only on the first cell group.

If the first cell group and the second cell group are managed by different base stations and the control information includes at least one of an SCell activation/deactivation message, a timing advance command (TAC), downlink control information (DCI) and aperiodic channel state information (CSI), at least one of the control information and the response signal may be transmitted and received on a cell group, to which the specific cell belongs.

If the control information includes a timing advance command (TAC) and the first cell group and the second cell group are managed by the same base station, the TAC may include a per-timing advance group (TAG) TAC for at least one of the first cell group and the second cell group, and, if the control information includes the TAC and the first cell group and the second cell group are managed by different base stations, the TAC may include only a per-TAG TAC for a cell group, to which the specific cell belongs.

If the control information includes downlink control information (DCI) and the first cell group and the second cell group are managed by the same base station, the DCI may include scheduling information of at least one of the first cell group and the second cell group, and, if the control information includes the DCI and the first cell group and the second cell group are managed by different base stations, the DCI may include only scheduling information of a cell group, to which the specific cell belongs.

According to the present invention, it is possible to efficiently transmit/receive control information in a wireless communication system. More specifically, it is possible to efficiently transmit/receive control information in inter-site carrier aggregation (CA).

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE EMBODIMENTS

The following technologies can be applied to a variety of radio access systems, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

Although the following embodiments focus on the 3GPP LTE/LTE-A system for clarity of description, the technical features of the present invention are not limited thereto. It should be noted that specific terms disclosed in the present invention are proposed for the convenience of description and better understanding of the present invention, and the use of these specific terms may be changed to another format within the technical scope or spirit of the present invention.

First, the terms used in the present specification will be described.

Figure 1:
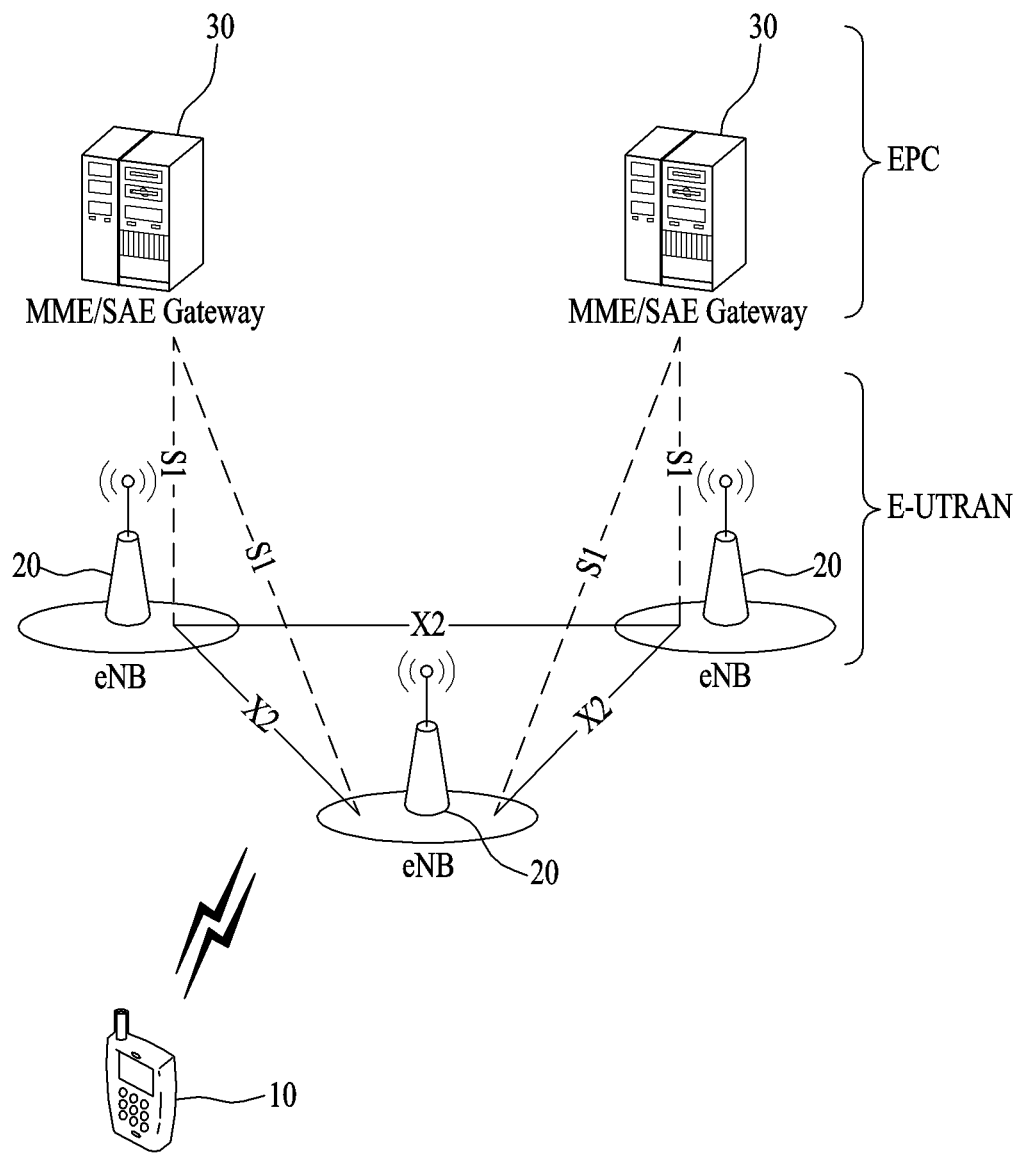
FIG. 1 is a diagram showing a network structure of an evolved universal mobile telecommunication system (E-UMTS).

FIG. 1 is a diagram showing a network structure of an E-UMTS. The E-UMTS is also called a Long Term Evolution (LTE) system. Communication networks are widely arranged to provide a variety of communication services such as voice and packet data.

Referring to FIG. 1, an E-UMTS network mainly includes an Evolved Universal Terrestrial Radio Access Network (E-UTRAN), an Evolved Packet Core (EPC) and one or more user equipments (UEs). The E-UTRAN includes one or more base stations (eNBs) 20 and one or more UEs 10 may be located in one cell. A mobility management entity/system architecture evolution (MME/SAE) gateway 30 is located at an end of a network and is connected to an external network. Downlink refers to communication from the eNB 20 to the UE 10 and uplink refers to communication from the UE to the eNB.

The UE 10 is a communication device held by a user and is also referred to as a mobile station (MS), a user terminal (UT), a subscriber station (SS) or a wireless device. The eNB 20 is generally a fixed station communicating with the UE 10 and is also referred to as an access point (AP). The eNB 20 provides an endpoint of a user plane and a control plane to the UE 10. One eNB 20 may be located in each cell. An interface for transmitting user traffic or control traffic may be used between the eNBs 20. The MME/SAE gateway 30 provides an endpoint of a session and mobility management function to the UE 10. The eNB 20 and the MME/SAE gateway 30 may be connected through an S1 interface.

MME provides various functions such as distribution of a paging message to the eNBs 20, security control, idle state mobility control, SAE bearer control and encryption and integrity protection of non access stratum (NAS) signaling. The SAE gateway host provides various functions including user plane switching for plane packet completion and mobility support of the UE 10. The MME/SAE gateway 30 is briefly referred to as a gateway in the present specification. However, the MME/SAE gateway 30 includes both the MME gateway and the SAE gateway.

A plurality of nodes may be connected between the eNB 20 and the gateway 30 through an S1 interface. The eNBs 20 may be connected to each other through an X2 interface and neighboring eNBs may have a mesh network structure employing the X2 interface.

Figure 2:
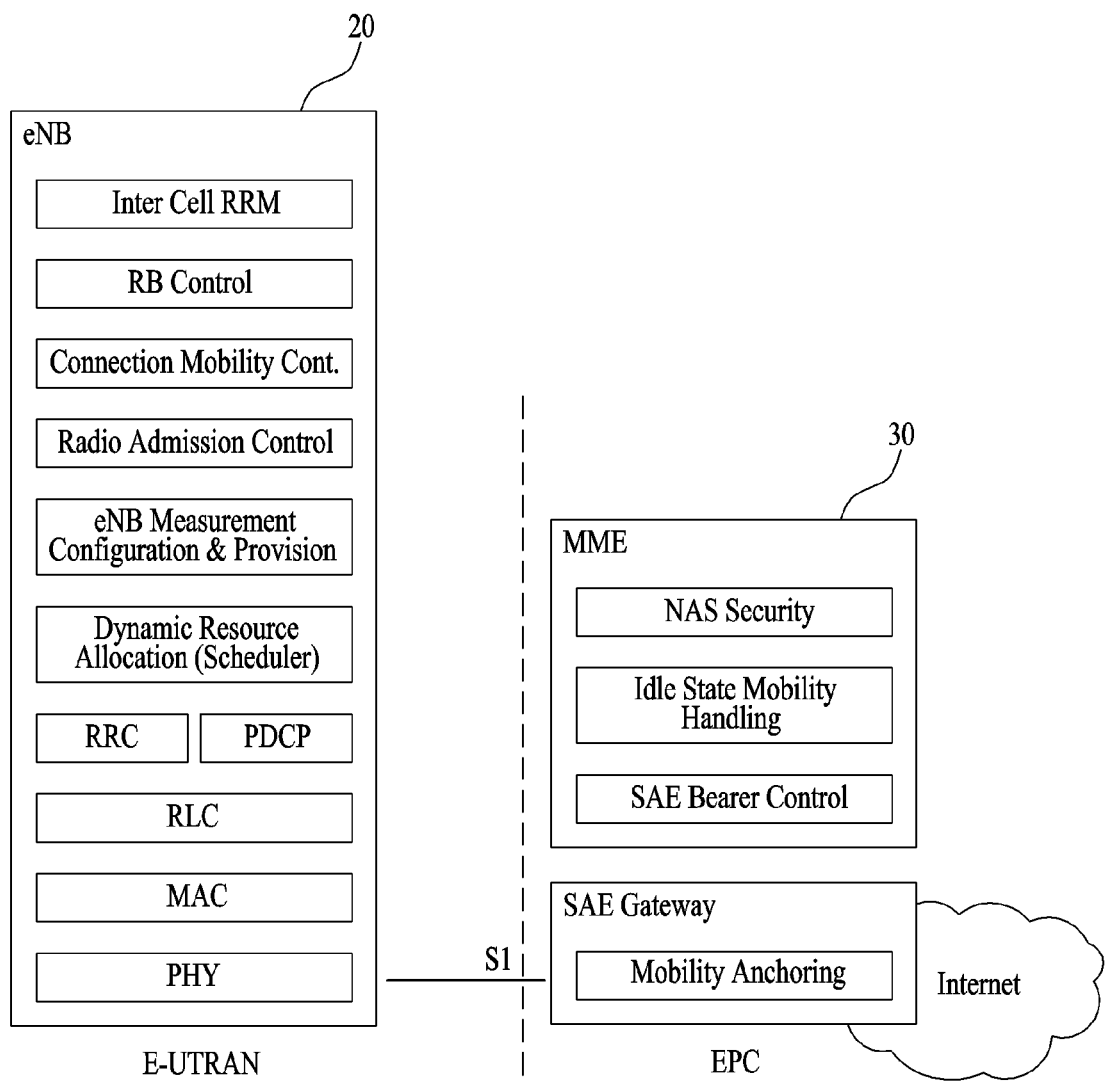
FIG. 2 is a diagram showing the structure of an evolved universal terrestrial radio access network (E-UTRAN) and a gateway.

FIG. 2 is a diagram showing the structures of a general E-UTRAN and a general gateway 30. Referring to FIG. 2, the eNB 20 may perform functions such as selection for the gateway 30, routing to the gateway during radio resource control (RRC) activation, scheduling and transmission of a paging message, scheduling and transmission of broadcast channel (BCCH), dynamic resource allocation for UEs 10 in uplink/downlink, configuration and preparation of eNB measurement, radio bearer control, radio admission control (RAC) and connection mobility control in an LTE-ACTIVE state. The gateway 30 may perform functions such as paging transmission, LTE_IDLE state management, user plane encryption, system architecture evolution (SAE) bearer control and encryption and integrity protection of non access stratum (NAS) signaling.

Figure 3A:
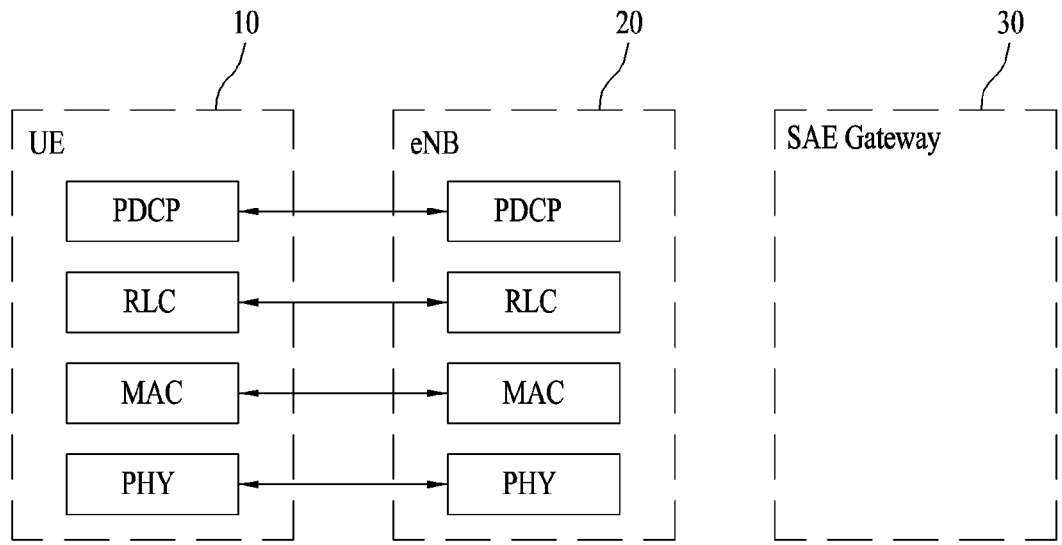
FIGS. 3A to 3B are diagrams showing a user/control plane protocol.
Figure 3B:
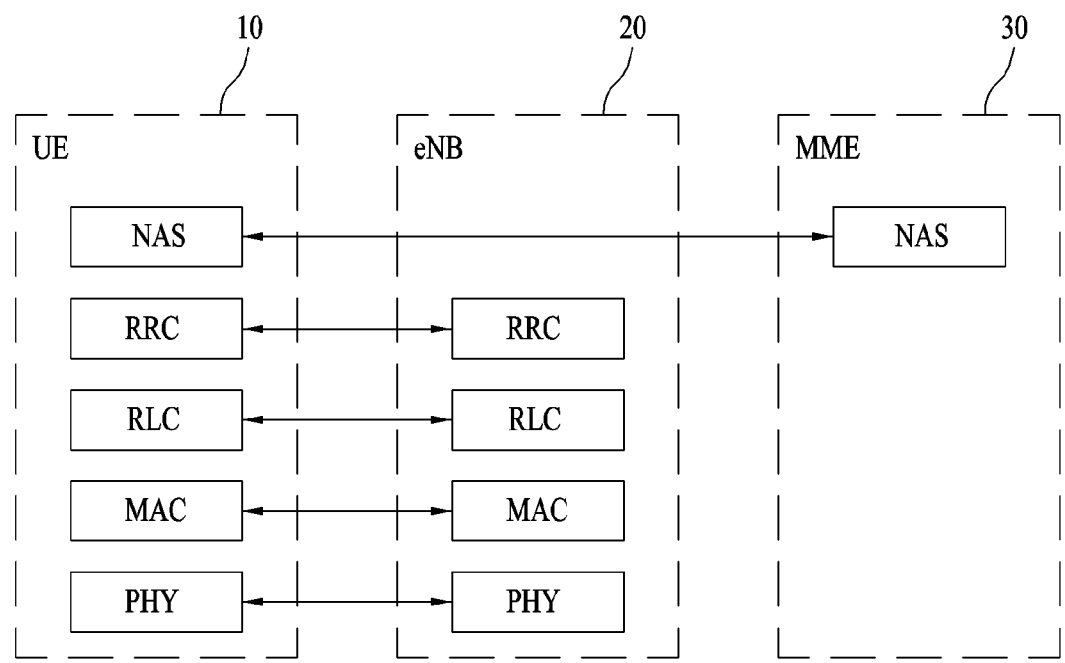

FIGS. 3A to 3B are diagrams showing a user-plane protocol and control-plane protocol stack for an E-UMTS. Referring to FIGS. 3A to 3B, protocol layers may be divided into a first layer (L1), a second layer (L2) and a third layer (L3) based on a lower three layers of an open system interconnection (OSI) standard model known in a technical field of a communication system.

A physical (PHY) layer of a first layer (L1) provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel.

A Medium Access Control (MAC) layer of a second layer (L2) provides a service to a Radio Link Control (RLC) layer of a higher layer via a logical channel. The RLC layer of the second layer (L2) supports reliable data transmission. If the MAC layer performs an RLC function, the RLC layer may be included as a functional block of the MAC layer. A Packet Data Convergence Protocol (PDCP) layer of the second layer (L2) performs a header compression function. The header compression function enables efficient transmission of an Internet Protocol (IP) packet such as an IPv4 packet or an IPv6 packet in a radio interface having a relatively small bandwidth.

A Radio Resource Control (RRC) layer located at the bottom of a third layer (L3) is defined only on the control plane and is responsible for control of logical, transport, and physical channels in association with configuration, re-configuration, and release of Radio Bearers (RBs). The RB means a service provided by the second layer (L2) for data communication between the UE and the E-UTRAN.

Referring to FIG. 3A, the RLC and MAC layers end at the eNB 20 and may perform functions scheduling automatic repeat request (ARQ) and hybrid automatic repeat request (HARQ). The PDCP layer ends at the eNB 20 and may perform functions such as header compression, integrity protection and encryption.

Referring to FIG. 3B, the RLC and MAC layers end at the eNB 20 and perform the same functions as the control plane. As shown in FIG. 3A, the RRC layer ends at the eNB 20 and may perform functions such as broadcasting, paging, RRC connection management, radio bearer (RB) control, mobility function and UE measurement report and control. The NAS control protocol ends at the MME of the gateway 30 and may perform functions such as SAE bearer management, authentication, LTE-IDLE mobility handling, paging transmission in an LTE_IDLE state and security control for signaling between the gateway and the UE 10.

The NAS control protocol may use three states. An LTE-DETACHED state is used when there is no RRC entity. An LTE_IDLE state is used when there is no RRC connection while storing minimum UE 10 information. An LTE-_ACTIVE state is used when an RRC state is configured. The RRC state is subdivided into an RRC_IDLE state and an RRC_CONNECTED state.

In the RRC_IDLE state, the UE 10 performs discontinuous reception (DRX) configured by NAS using a uniquely allocated ID in a tracking region. That is, the UE 10 may monitor a paging signal at a specific paging occasion per UE-specific paging DRX cycle to receive broadcast of system information and paging information. In the RRC_IDLE state, the eNB does not store any RRC context.

In the RRC_CONNECTED state, the UE 10 may transmit and/or receive data to/from the eNB using context in the E-UTRAN and E-UTRAN RRC connection. In addition, the UE may report channel quality information and feedback information to the eNB. In the RRC_CONNECTED state, the E-UTRAN knows a cell, to which the UE 10 belongs. Accordingly, the network may transmit and/or receive data to/from the UE 10, control mobility such as UE handover and perform cell measurement of peripheral cells.

Figure 4:
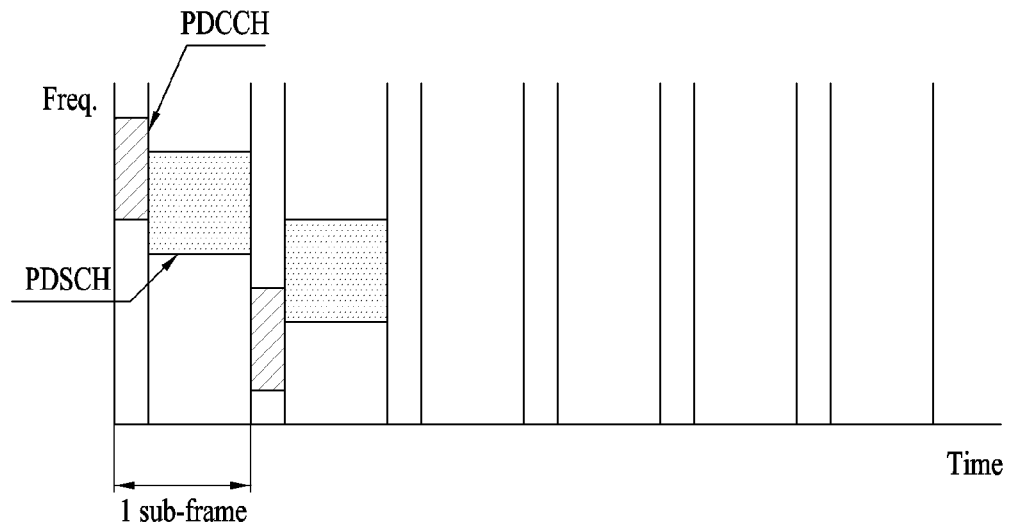
FIG. 4 is a diagram showing the structure of a radio frame.

FIG. 4 is a diagram showing the structure of a radio frame.

Referring to FIG. 4, the E-UMTS system uses a radio frame of 10 ms and one radio frame includes 10 subframes. In addition, one subframe includes two consecutive slots. The length of one slot may be 0.5 ms. One subframe includes a plurality of symbols (e.g., OFDM symbols, SC-FDM symbols). One subframe includes a plurality of resource blocks and one resource block includes a plurality of symbols and a plurality of subcarriers. In downlink, some (e.g., first symbol) of the plurality of symbols configuring the subframe may be used to transmit L1/L2 control information.

More specifically, a maximum of three (four) OFDM symbols of a front portion of a first slot within a subframe corresponds to a control region to which a downlink control channel is allocated for L1/L2 control information transmission. The remaining OFDM symbols correspond to a data region to which a Physical Downlink Shared Channel (PDSCH) is allocated. Examples of the downlink control channels include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and carries information about the number of OFDM symbols used to transmit the control channel within the subframe. The PHICH carries a HARQ ACK/NACK signal in response to uplink transmission.

The control information transmitted through the PDCCH is referred to as Downlink Control Information (DCI). In the DCI format, formats 0, 3, 3A and 4 are defined for uplink and formats 1, 1A, 1B, 1C, 1D, 2, 2A, 2B and 2C are defined for downlink. The DCI format selectively includes hopping flag, RB allocation, modulation coding scheme (MCS), redundancy version (RV), new data indicator (NDI), transmit power control (TPC), cyclic shift demodulation reference signal (DM RS), channel quality information (CQI) request, HARQ process number, transmitted precoding matrix indicator (TPMI), precoding matrix indicator (PMI), etc.

The PDCCH may carry transmission format and resource allocation information of a Downlink Shared Channel (DL-SCH), transmission format and resource allocation information of an Uplink Shared Channel (UL-SCH), paging information on a Paging Channel (PCH), system information on the DL-SCH, resource allocation of a higher layer control message such as a Random Access Response (RAR) transmitted on the PDSCH, a set of transmit (Tx) power control commands for individual UEs within a UE group, a Tx power control command, information indicating activation of Voice over IP (VoIP), etc. A plurality of PDCCHs may be transmitted within the control region. The UE may monitor the plurality of PDCCHs. The PDCCHs are transmitted as an aggregate of one or several consecutive control channel elements (CCEs). The CCE is a logical allocation unit used to provide the PDCCHs with a coding rate based on the state of a radio channel. The CCE corresponds to a plurality of resource element groups (REGs). The format of the PDCCH and the number of PDCCH bits are determined based on the number of CCEs. The BS determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC.

Figure 5:
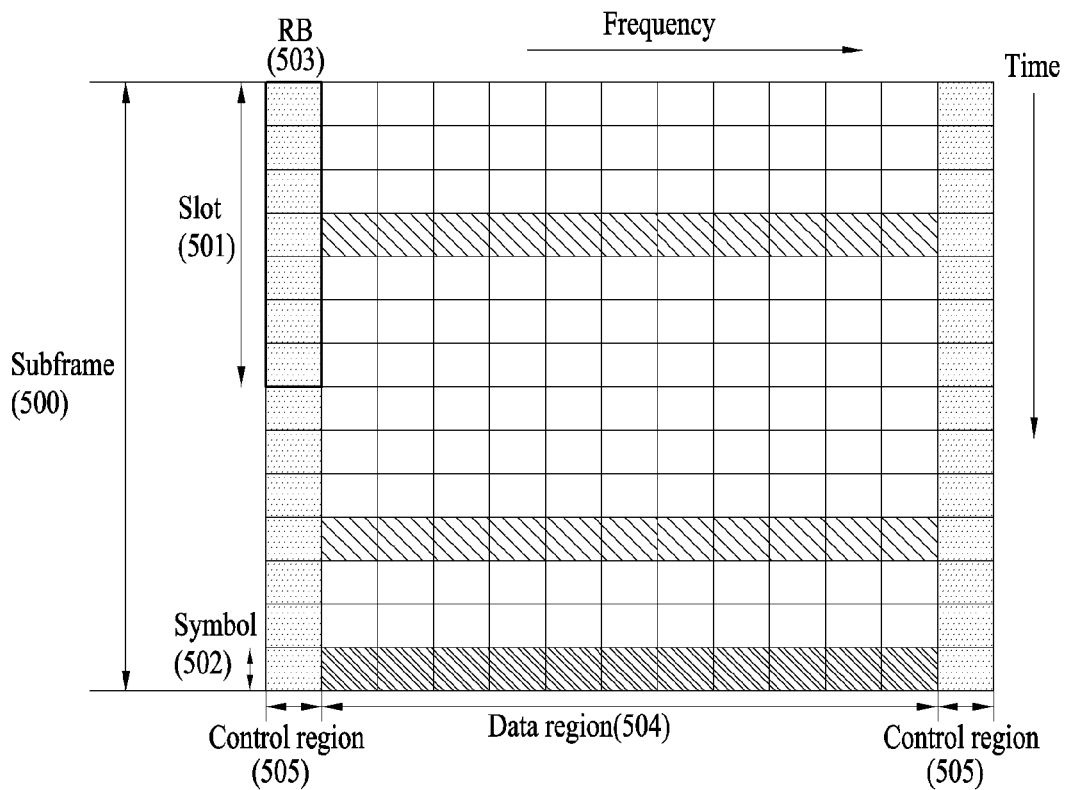
FIG. 5 is a diagram showing the structure of an uplink subframe.

FIG. 5 is a diagram showing the structure of an uplink subframe.

Referring to FIG. 5, a subframe having a length of 1 ms includes two of slots each having a length of 0.5 ms. The slot may include SC-FDMA symbols, the number of which is changed according to CP length. For example, the slot includes seven SC-FDMA symbols in a normal CP case and includes six SC-FDMA symbols in an extended CP case. A resource block 503 is a resource allocation unit corresponding to 12 subcarriers in a frequency domain and one slot in a time domain. The structure of the uplink subframe may be divided into a control region 504 and a data region 505. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH may be used to transmit the following control information.

Scheduling request (SR): Information used to request uplink (UL)-SCH resources. This is transmitted using an on-off keying (OOK) method.

HARQ ACK/NACK: Response signal to downlink data packets. This indicates whether downlink data packets have been successfully received. 1-bit ACK/NACK is transmitted in response to a single downlink codeword and 2-bit ACK/NACK is transmitted in response to two downlink codewords.

Channel quality information (CQI): Feedback information for a downlink channel (e.g., channel quality indicator (CQI)). Multiple input multiple output (MIMO)-related feedback information includes a rank indicator (RI), a precoding matrix indicator (PMI) and a precoding type indicator (PTI). 20 bits are used per subframe. Periodic CSI (p-CSI) is periodically transmitted via a PUCCH according to period/offset configured by a higher layer. In contrast, aperiodic CSI (a-CSI) is aperiodically transmitted via a PUSCH according to a command of an eNB.

Table 1 shows a mapping relationship between PUCCH format and UCI in LTE/LTE-A.

TABLE 1

| PUCCH format | Uplink control information (UCI) |
|---|---|
| Format 1 | Scheduling request (SR) (unmodulated waveform) |
| Format 1a | 1-bit HARQ ACK/NACK (SR presence/absence) |
| Format 1b | 2-bit HARQ ACK/NACK (SR presence/absence) |
| Format 2 | CQI (20 coded bits) |
| Format 2 | CQI and 1- or 2-bit HARQ ACK/NACK (20 bits) (only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

A/N transmission and CSI transmission may be required on the same subframe. In this case, if A/N+CSI simultaneous transmission non-permission is configured at a higher layer ("Simultaneous-AN-and-CQI" parameter=OFF), A/N transmission is only performed using PUCCH format 1a/1b and CSI transmission is dropped. In contrast, if A/N+CQI simultaneous transmission permission is configured ("Simultaneous-AN-and-CQI" parameter=ON), A/N and CQI are simultaneously transmitted via PUCCH format 2/2a/2b. More specifically, in a normal CP case, A/N is embedded in a second RS of each slot (an RS is multiplied by A/N) in PUCCH format 2/2a/2b. In an extended CP case, A/N and CQI are jointly coded and then transmitted via PUCCH format 2.

Figure 6:
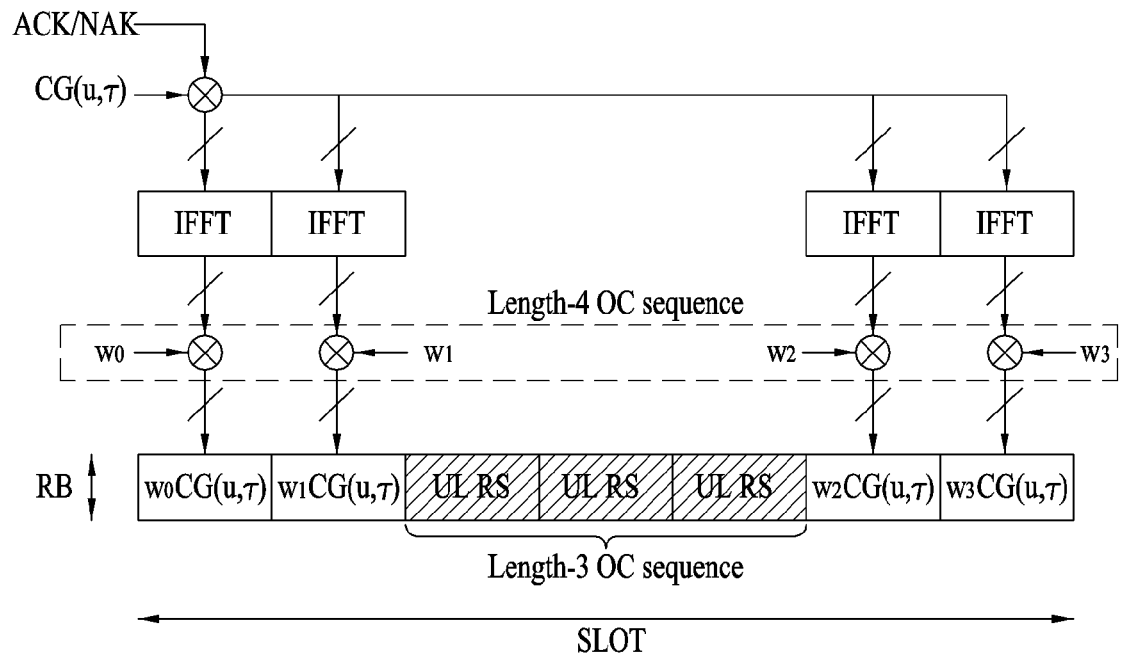
FIG. 6 is a diagram showing a slot level structure of physical uplink control channel (PUCCH) format 1a/1b.

FIG. 6 is a diagram showing a slot level structure of physical uplink control channel (PUCCH) format 1a/1b. The structure of PUCCH format 1 used for SR transmission is equal to the structure of PUCCH format 1a/1b.

Referring to FIG. 6, 1-bit [b(0)] A/N information and 2-bit [b(0)b(1)] A/N information are respectively modulated according to a binary phase shift keying (BPSK) modulation scheme and a quadrature phase shift keying (QPSK) modulation scheme, and one A/N modulation symbol is generated ($d_0$). In A/N information, each bit [b(i), i=0, 1] indicates a HARQ response to a transport block, is 1 in case of positive ACK and is 0 in case of negative ACK (NACK). Table 4 shows a modulation table for PUCCH formats 1a and 1b in legacy LTE.

TABLE 2

| PUCCH format | b(0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

In PUCCH format 1a/1b, cyclic shift (CS) ($\alpha_{cs,x}$) is performed in the frequency domain and spreading is performed using an orthogonal code (OC) (e.g., Walsh-Hadamard or DFT code) ($w_0$, $w_1$, $w_2$, $w_3$) in the time domain.

Figure 7:
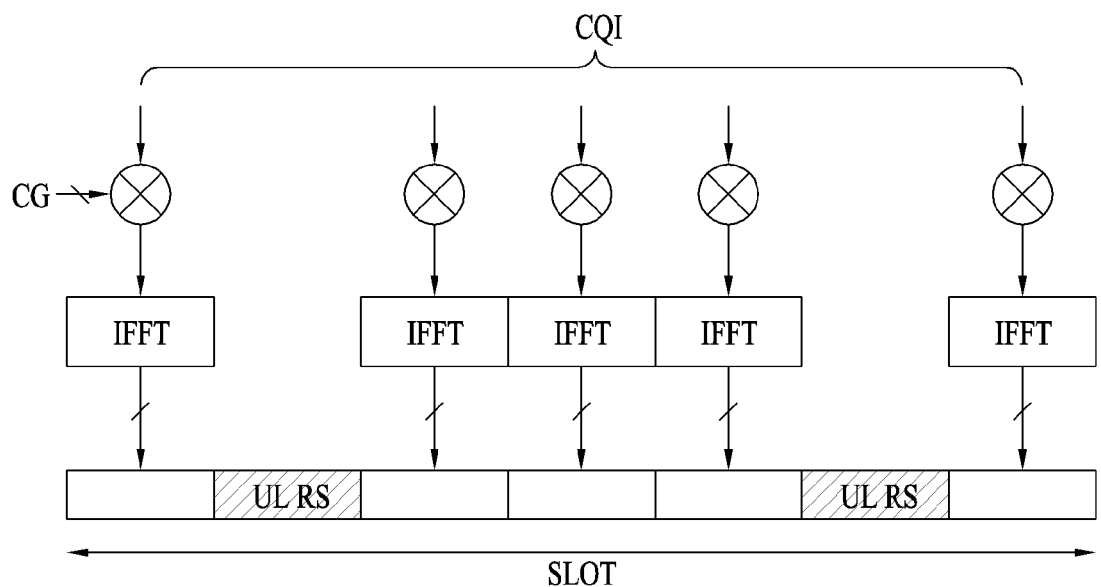
FIG. 7 is a diagram showing a slot level structure of PUCCH format 2/2a/2b.

FIG. 7 is a diagram showing PUCCH format 2/2a/2b.

Referring to FIG. 7, if a normal CP is configured, PUCCH format 2/2a/2b includes five QPSK data symbols and two RS symbols at a slot level. If an extended CP is configured, PUCCH format 2/2a/2b includes five QPSK data symbols and one RS symbol at a slot level. If an extended CP is configured, an RS symbol is located at a fourth SC-FDMA symbol of each slot. Accordingly, PUCCH format 2/2a/2b may carry a total of 10 QPSK data symbols. Each QPSK symbol is spread in the frequency domain by a CS and then is mapped to an SC-FDMA symbol. The RS may be multiplexed by code division multiplexing (CDM) using a CS.

Figure 8:
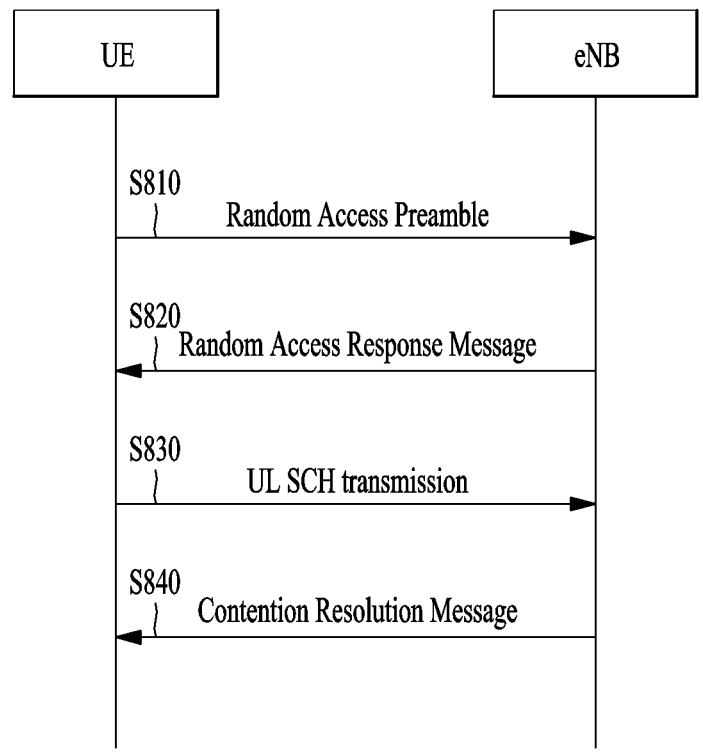
FIG. 8 is a diagram showing a random access procedure.

FIG. 8 is a diagram showing a random access procedure.

Referring to FIG. 8, a UE receives random access information from an eNB via system information. Thereafter, if random access is necessary, the UE transmits a random access preamble (message 1) to the eNB (S810). When the eNB receives the random access preamble from the UE, the eNB transmits a random access response message (RAR) (message 2) to the UE (S820). More specifically, downlink scheduling information of the random access response message may be CRC-masked with a random access RNTI (RA-RNTI) and transmitted on an L1/L2 control channel (PDCCH). A PDCCH masked with the RA-RNTI (hereinafter, RAR-PDCCH) is transmitted in a common search space. The UE, which has received a downlink scheduling signal masked with the RA-RNTI, may receive the random access response message from a scheduled PDSCH and decode the random access response message. Thereafter, the UE checks whether random access response information signaled thereto is included in the random access response message. Whether the random access response information signaled thereto is included may be checked by determining whether a random access preamble ID (RAID) for the preamble transmitted by the UE is present. The random access response information includes timing advance (TA) indicating timing offset information for synchronization, radio resource allocation information used for uplink, a temporary identifier for UE identification (e.g., temporary C-RNTI, TC-RNTI). When the UE receives the random access response information, an uplink message (message 3) is transmitted via an uplink shared channel (SCH) according to the radio resource allocation information included in the response information (S830). The eNB receives the uplink message and then transmits a contention resolution (message 4) to the UE (S840).

Figure 9:
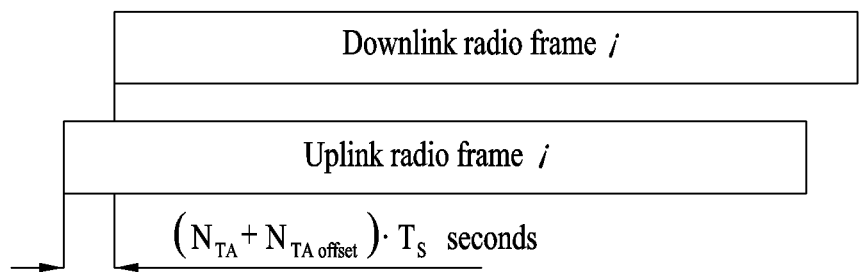
FIG. 9 is a diagram showing an uplink-downlink timing relationship.

FIG. 9 is a diagram showing an uplink-downlink timing relationship.

Referring to FIG. 9, at the UE, transmission of uplink radio frame #i may start at a point of time earlier than a point of time when transmission of a downlink radio frame corresponding thereto starts by $(N_{TA}+N_{TAoffset})\times T_s$. Here, $0 \leq N_{TA} \leq 20512$, $N_{TAoffset}=0$ in FDD and $N_{TAoffset}=624$ in TDD. $N_{TA}$ is indicated by a timing advance (TA) command and the UE adjusts transmission timing of an uplink signal (e.g., PUCCH, PUSCH, SRS, etc.) by $(N_{TA}+N_{TAoffset})\times TS$. UL transmission timing may be adjusted in units of $16T_s$. $T_s$ is a sampling time. The TA command included in the RAR has 11 bits, indicates values of 0 to 1282 and $N_{TA}=TA*16$. In the other case, the TA command has 6 bits, indicates values of 0 to 63 and is given with $N_{TA}=N_{TA,old}+(TA-31)*16$. The TA command TAC received on subframe #n is applied after subframe #n+6.

Figure 10:
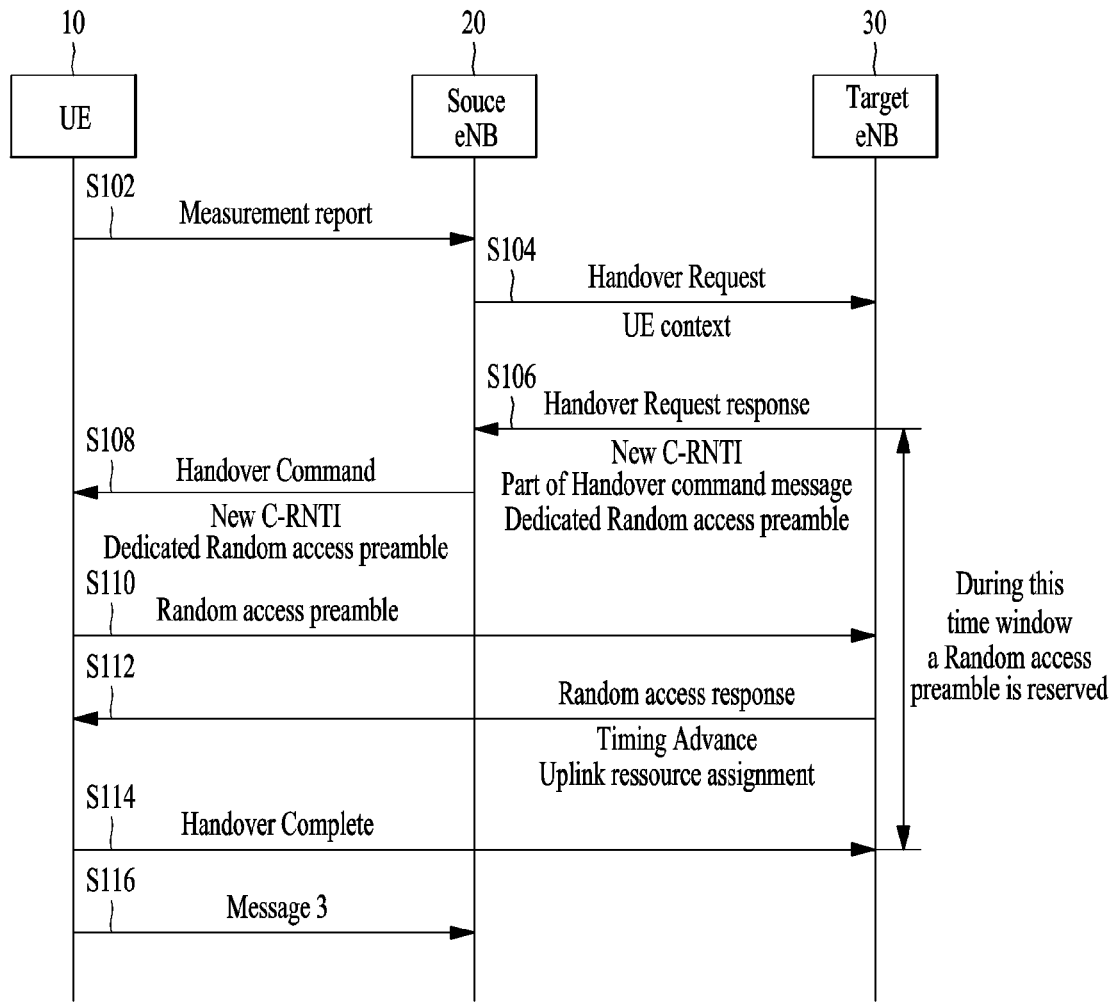
FIG. 10 is a diagram showing a handover procedure.

FIG. 10 is a diagram showing a handover procedure.

Referring to FIG. 10, a UE 10 transmits a measurement report to a source eNB 20 (S102). The source eNB 20 transmits a handover request message to a target eNB along with UE 10 context (S104). The target eNB 20 transmits a handover request response to the source eNB (S106). The handover request response includes a new C-RNTI, a part of handover command message and a dedicated preamble index for contention-free random access in a target cell. The source eNB 20 transmits a handover command to the UE (S108). The handover command includes a new C-RNTI and information related to random access such as a dedicated preamble index to be used by the UE 10. The random access procedure is performed in the target cell after a handover command in order for the UE 10 to acquire a timing advance (TA) value. The random access procedure is a contention-free procedure in which a preamble index is reserved for the UE 10 in order to avoid collision. The UE 10 transmits a random access preamble using a dedicated preamble index such that the target eNB 20 starts the random access procedure (S110). The target eNB 20 transmits a random access response message to the UE 10 (S112). The random access response message includes TA and uplink resource assignment. The UE 10 transmits a handover complete message to the target eNB 20 (S114).

Figure 11:
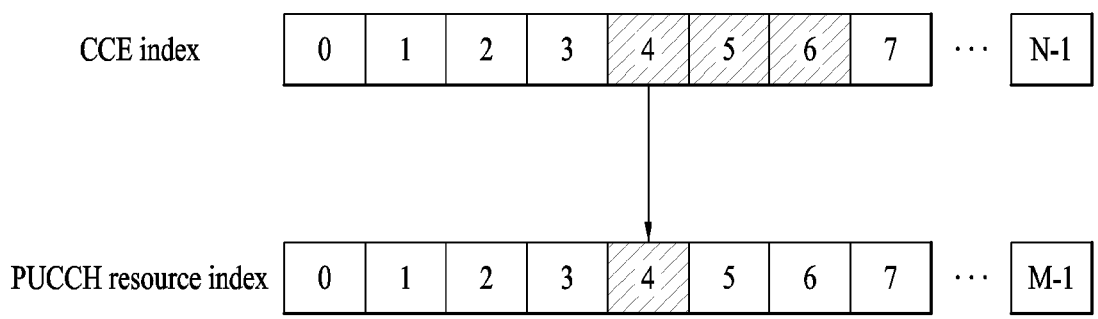
FIG. 11 is a diagram showing an example of determining a PUCCH resource for acknowledgement/negative acknowledgement (ACK/NACK) transmission.

FIG. 11 is a diagram showing an example of determining a PUCCH resource for acknowledgement/negative acknowledgement (ACK/NACK) transmission. In an LTE/LTE-A system, the PUCCH resource for A/N is not allocated to each UE in advance and a plurality of PUCCH resources is divided and used by a plurality of UEs in a cell at every point of time. More specifically, the PUCCH resource used for the UE to transmit A/N corresponds to a PDCCH carrying scheduling information of downlink data or a PDCCH indicating SPS release. A PDCCH transmitted to the UE on a downlink subframe is composed of one or more control channel elements (CCEs). The UE may transmit A/N via PUCCH resources corresponding to a specific CCE (e.g., a first CCE) among the CCEs configuring the PDCCH. As shown in FIG. 11, if it is assumed that information on the PDSCH is transmitted via a PDCCH composed of fourth to sixth CCEs, the UE transmits A/N using a PUCCH resource index 4 corresponding to a CCE 4 which is a first CCE configuring the PDCCH.

More specifically, in LTE/LTE-A, the PUCCH resource index is determined as follows.

$$n^{(1)}_{PUCCH}=n_{CCE}+N^{(1)}_{PUCCH} \qquad \text{Equation 1}$$

where, $n^{(1)}_{PUCCH}$ denotes a resource index of PUCCH format 1a/1b for transmitting ACK/NACK/DTX, $N^{(1)}_{PUCCH}$ denotes a signaling value received from a higher layer and $n_{CCE}$ denotes the smallest value among CCE indices used for PDCCH transmission. Cyclic shift (CS), orthogonal code (OC) and physical resource block (PRB) for PUCCH format 1a/1b are obtained from $n^{(1)}_{PUCCH}$.

Since an LTE UE cannot simultaneously transmit a PUCCH and a PUSCH, if UCI (e.g., CQI/PMI, HARQ-ACK, RI, etc.) needs to be transmitted on a subframe on which a PUSCH is transmitted, the UCI is multiplexed in a PUSCH region (PUSCH piggybacking). Even in LTE-A, the UE may be configured not to simultaneously transmit a PUCCH and a PUSCH. In this case, if UCI (e.g., CQI/PMI, HARQ-ACK, RI, etc.) needs to be transmitted on a subframe on which a PUSCH is transmitted, the UCI is multiplexed in a PUSCH region (PUSCH piggybacking).

Figure 12:
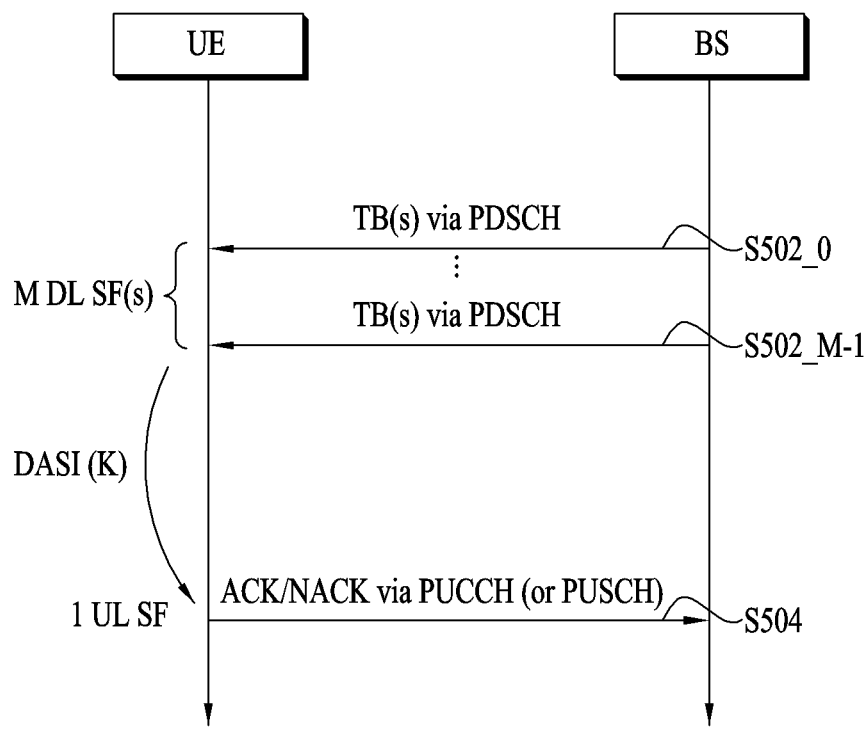
FIG. 12 is an ACK/NACK transmission procedure in a single cell situation.

FIG. 12 is an ACK/NACK transmission procedure in a single cell situation.

Referring to FIG. 12, a UE may receive one or more DL transmissions (e.g., PDSCH signals) on M DL subframes (SFs) (S502_0 to S502_M−1). Each PDSCH signal is used to transmit one or a plurality (e.g., 2) of transmission blocks (TBs) (or codewords (CWs)) according to a transmission mode (TM). In addition, although not shown, in steps S502_0 to S502_M−1, a PDCCH signal requesting an ACK/NACK response, e.g., a PDCCH signal indicating SPS release (an SPS release PDCCH signal) may also be received. If a PDSCH signal and/or an SPS release PDCCH signal is present in M DL subframes, the UE transmits A/N via one UL subframe corresponding to M DL subframes via a procedure of transmitting A/N (e.g., A/N (payload) generation, A/N resource allocation, etc.) (S504). A/N includes reception response information of the PDSCH signal and/or the SPS release PDCCH of steps S502_0 to S502_M−1. Although A/N is basically transmitted via a PUCCH (for example, see FIGS. 6 to 7), A/N may be transmitted via a PUSCH if a PUSCH is transmitted when A/N is transmitted. For A/N transmission, various PUCCH formats of Table 1 may be used. In order to reduce the number of transmitted A/N bits, various methods such as A/N bundling, A/N channel selection, etc. may be used.

M=1 in FDD and M is an integer of 1 or more in TDD. In TDD, a relationship between M DL subframes and a UL subframe on which A/N is transmitted is given by a downlink association set index (DASI).

Table 3 shows a DASI (K: $\{k_0, k_1, \ldots, k_{M-1}\}$) defined in LTE/LTE-A. If a PDSCH transmission and/or SPS release PDCCH is present in a subframe n-k (k∈K), the UE transmits ACK/NACK corresponding thereto on a subframe n.

Figure 13:
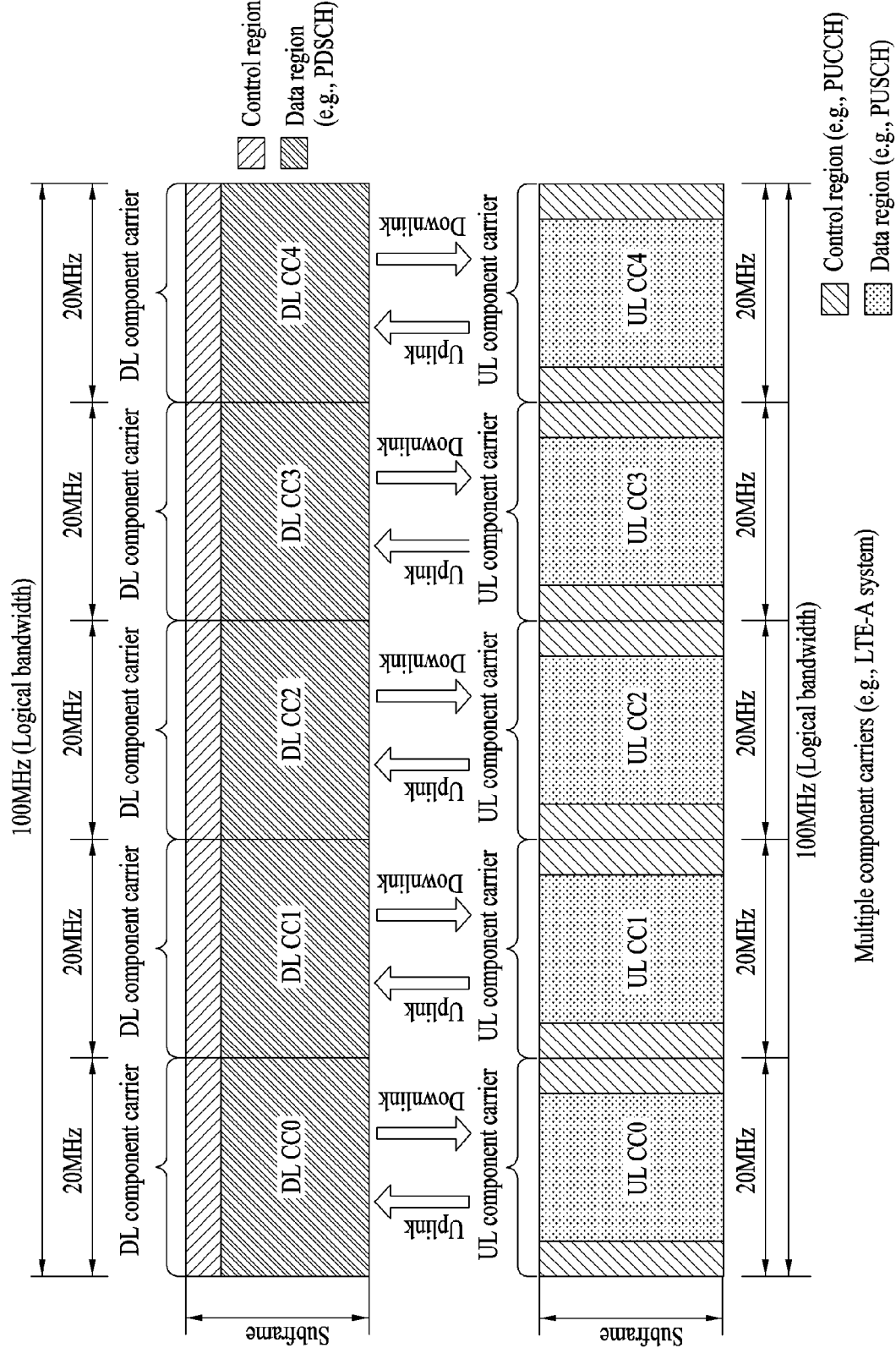
FIG. 13 is a diagram showing a carrier aggregation (CA) communication system.

Referring to FIG. 13, a plurality of uplink/downlink component carriers (CCs) may be aggregated to support a wider uplink/downlink bandwidth. CCs may or may not be adjacent to each other in the frequency domain. The bandwidth of each CC may be independently configured. Asymmetric carrier aggregation in which the number of UL CCs and the number of DL CCs are different is possible. For example, if the number of DL CCs is 2 and the number of UL CCs is 1, the DL CCs may correspond to the UL CC 2:1. The DL CC/UL CC link may be fixed or semi-static. In addition, although an overall system bandwidth includes N CCs, a frequency bandwidth monitored/received by a specific UE may be restricted to L (<N) CCs. Various carrier aggregation parameters may be configured in a cell-specific, UE group-specific or UE-specific manner. Control information may be configured to be transmitted and received only via a specific CC. Such a specific CC may be referred to as a primary CC (PCC) and the remaining CCs may be referred to as secondary CCs (SCCs).

LTE-A uses the concept of a cell in order to manage radio resources. The cell is defined as a combination of downlink

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Upon operation using a TDD scheme, the UE should transmit an A/N signal for one or more DL transmissions (e.g., PDSCH), which are received via M DL SFs, via one UL SF. A method for transmitting A/N for a plurality of DL SFs via one UL SF will now be described.

1) A/N bundling: A/N bits for a plurality of data units (e.g., a PDSCH, an SPS release PDCCH, etc.) are combined by a logical operation (e.g., logical-AND operation). For example, when all data units are successfully decoded, a receiver (e.g., the UE) transmits an ACK signal. In contrast, when any one of the data units fails to be decoded (or detected), the receiver transmits a NACK signal or does not transmit a signal.

2) Channel selection: The UE, which has received a plurality of data units (e.g., a PDSCH, an SPS release PDCCH, etc.), occupies a plurality of PUCCH resources for A/N transmission. An A/N response to the plurality of data units is identified by a combination of PUCCH resources used for actual A/N transmission and transmitted A/N information (e.g., a bit value, a QPSK symbol value, etc.). A channel selection method is also referred to as an A/N selection method or a PUCCH selection method.

FIG. 13 is a diagram showing a carrier aggregation (CA) communication system. An LTE-A system uses carrier aggregation or bandwidth aggregation technology to aggregate a plurality of uplink/downlink frequency blocks to use a larger uplink/downlink bandwidth in order to use a wider frequency bandwidth. Each frequency block is transmitted using a component carrier (CC). The component carrier may be understood as a carrier frequency (or a center carrier or a center frequency) for a frequency block.

resources and uplink resources, and the uplink resources are not mandatory. Accordingly, the cell may be composed of downlink resources alone or both downlink resources and uplink resources. If carrier aggregation is supported, linkage between a carrier frequency (or a DL CC) of downlink resources and a carrier frequency (or a UL CC) of uplink resources may be indicated by system information. A cell operating on a primary frequency (e.g., a primary CC (PCC)) may be referred to as a PCell and a cell operating on a secondary frequency (e.g., a secondary CC (SCC)) may be referred to as an SCell. The PCell is used for a UE to perform an initial connection establishment procedure or a connection re-establishment procedure. The PCell may indicate a cell indicated in a handover procedure. The SCell may be configured after RRC connection establishment and may be used to provide additional radio resources. The PCell and the SCell may be collectively referred to as a serving cell. In the case of a UE which is in an RRC_CONNECTED state but does not establish or support carrier aggregation, only one serving cell including only the PCell exists. In case of a UE which is in an RRC_CONNECTED state and establishes carrier aggregation, one or more serving cells exist and the serving cells include the PCell and all SCells. For carrier aggregation, a network may be added to the PCell initially configured in a connection establishment procedure and one or more SCells may be configured for a UE supporting carrier aggregation, after an initial security activation procedure is initiated.

If cross-carrier scheduling (or cross-CC scheduling) is applied, a PDCCH for downlink allocation is transmitted on DL CC #0 and a PDSCH corresponding thereto is transmitted on DL CC #2. For cross-CC scheduling, a carrier indicator field (CIF) may be introduced. Presence/absence of a CIF within a PDCCH may be configured by higher layer signaling (e.g., RRC signaling) in a semi-static and UE-specific (or UE group-specific) manner. A baseline of PDCCH transmission will be summarized as follows.

CIF disabled: A PDCCH on a DL CC allocates PDSCH resources on the same DL CC or PUSCH resources on a single linked UL CC.

CIF enabled: A PDCCH on a DL CC may allocate PDSCH or PUSCH resources on a specific DL/UL CC among a plurality of aggregated DL/UL CCs using a CIF.

If the CIF is present, an eNB may allocate a PDCCH monitoring DL CC set in order to reduce BD complexity of a UE. The PDCCH monitoring DL CC set is a part of all aggregated DL CCs and includes one or more DL CCs. A UE performs PDCCH detection/decoding only on the DL CC. That is, if an eNB schedules a PDSCH/PUSCH to a UE, the PDCCH is transmitted only via a PDCCH monitoring DL CC set. The PDCCH monitoring DL CC set may be configured in a UE-specific, UE group-specific or cell-specific manner. The term "PDCCH monitoring DL CC" may be replaced with the term "monitoring carrier" or "monitoring cell". In addition, the term "CCs aggregated for a UE" may be replaced with the term "serving CC", "serving carrier" or "serving cell".

Figure 14:
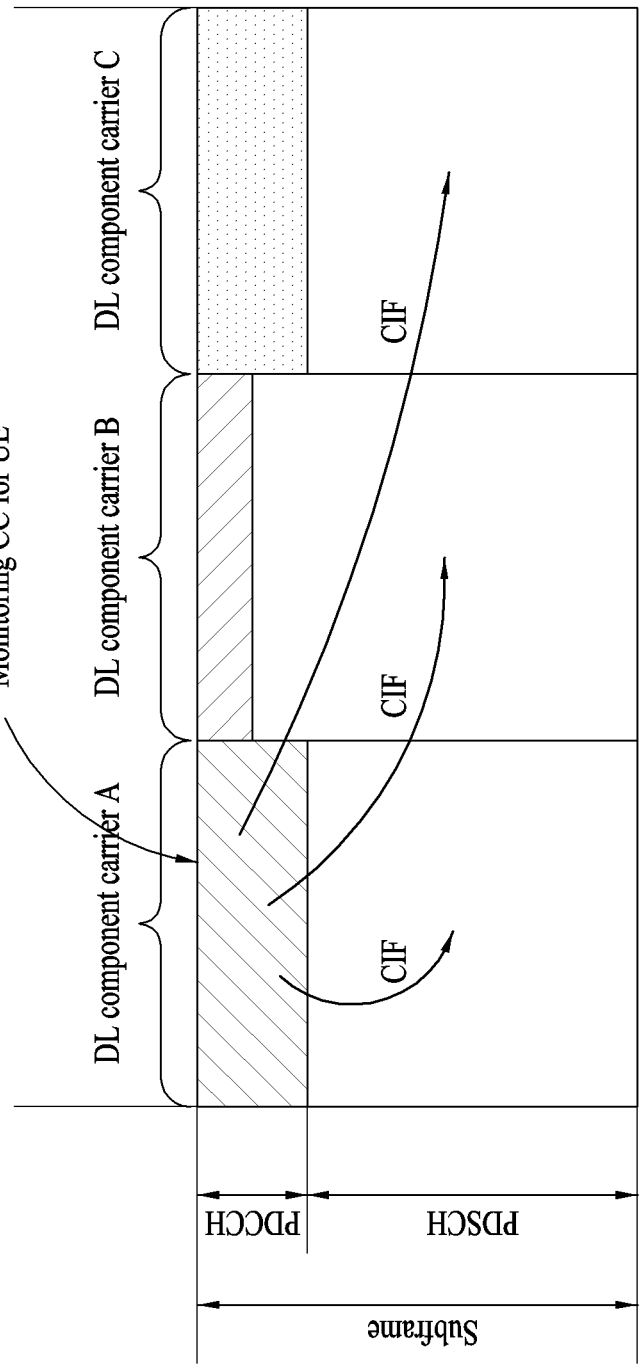
FIG. 14 is a diagram showing scheduling when a plurality of carriers is aggregated.

FIG. 14 shows scheduling if a plurality of carriers is aggregated. Assume that three DL CCs are aggregated. Assume that a DL CC A is configured to a PDCCH monitoring DL CC. DL CCs A to C may be referred to as serving CCs, serving carriers or service cells. If a CIF is disabled, each DL CC may transmit only a PDCCH scheduling a PDSCH thereof without the CIF according to an LTE PDCCH rule. In contrast, if a CIF is enabled by UE-specific (or UE group-specific or cell-specific) higher layer signaling, the DL CC A (monitoring DL CC) may transmit not only a PDCCH scheduling a PDCCH of the DL CC A but also a PDCCH scheduling a PDSCH of another CC, using the CIF. In this case, the PDCCH is not transmitted in the DL CC B/C.

Figure 15:
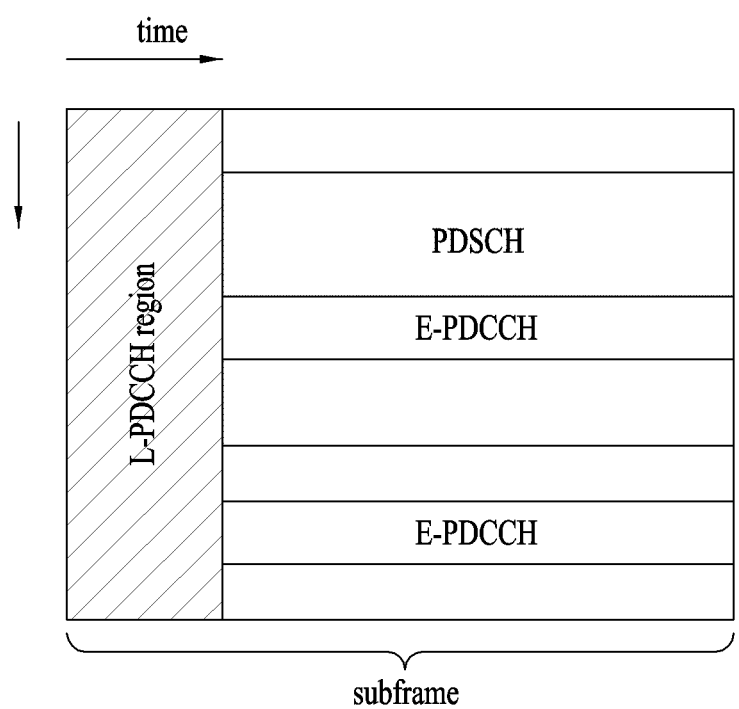
FIG. 15 is a diagram showing an example of allocating a PDCCH to a data region of a subframe.

FIG. 15 is a diagram showing an example of allocating a downlink physical channel to a subframe.

Referring to FIG. 15, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type.

Figure 16:
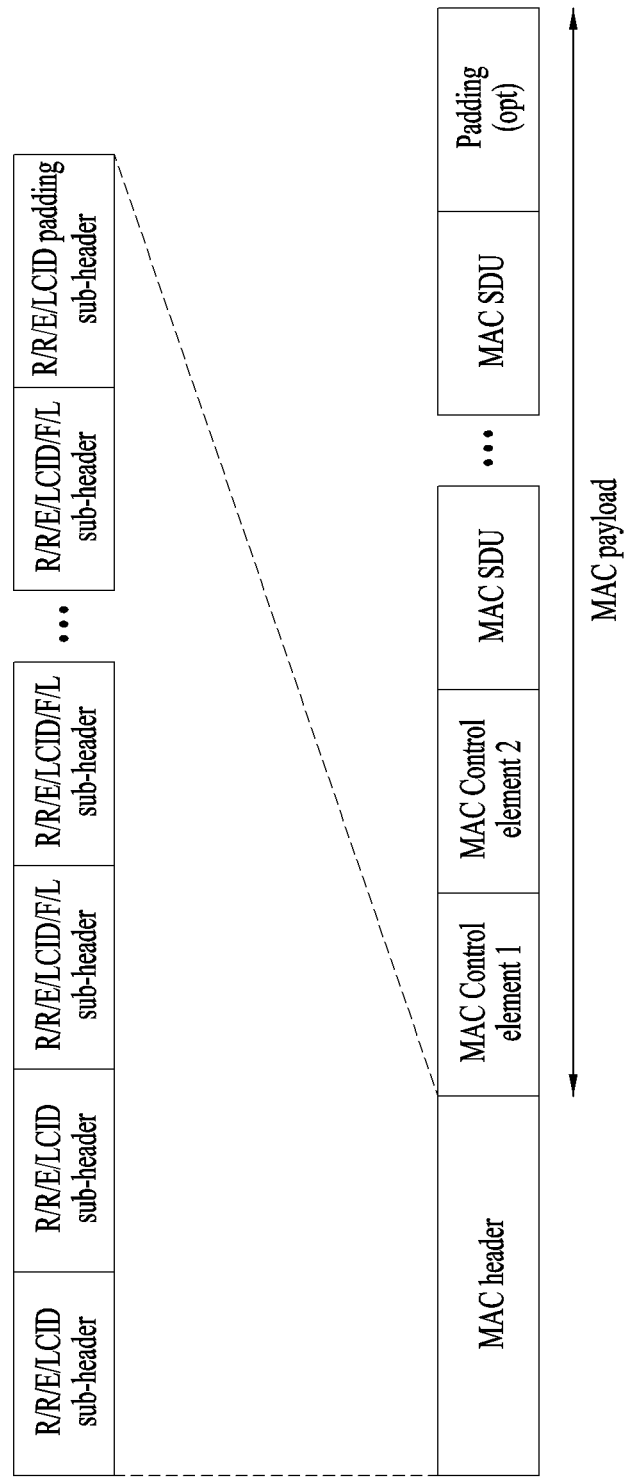
FIG. 16 is a diagram showing a medium access control protocol data unit (MAC PDU).

FIG. 16 is a diagram showing a medium access control protocol data unit (MAC PDU). The MAC PDU is transmitted via a downlink shared channel (DL-SCH) and an uplink shared channel (UL-SCH).

Referring to FIG. 16, the MAC PDU includes a MAC header, 0 or more MAC service data units (SDUs) and 0 or more MAC control elements (CEs). A MAC PDU subheader has the same order as the MAC SDU and MAC CE corresponding thereto. The MAC CE is located in front of the MAC SDU. The MAC CE is used to carry a variety of MAC control information. For example, the MAC CE includes SCell activation/deactivation information, TAC information, buffer status report (BSR) information and power headroom report (PHR) information.

Figure 17:
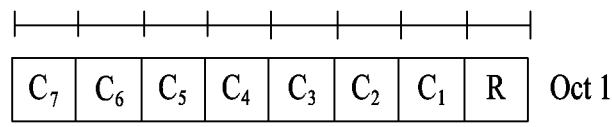
FIG. 17 is a diagram showing an SCell activation/deactivation MAC control element (CE).

FIG. 17 is a diagram showing an SCell activation/deactivation MAC control element (CE). An eNB may individually activate or deactivate the SCell with respect to all SCell aggregated for the UE using the activation/deactivation MAC CE. Meanwhile, a PCell is always activated.

Referring to FIG. 17, the activation/deactivation MAC CE is identified by the MAC PDU having a logical channel identifier (LCID) (e.g., LCID=11011) indicating activation/deactivation. The activation/deactivation MAC CE is composed of a single octet having seven C-fields and one R-field.

$C_i$: Indicates the activation/deactivation state of the SCell having ScellIndex i. If there is no SCell having ScellIndex i, the UE ignores the $C_i$ field. The $C_i$ field is set to 1 if activation is indicated and is set to 0 if deactivation is indicated.

R: Reserved bit. This is set to 0.

Figure 18:
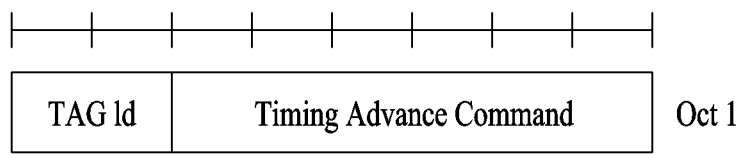
FIG. 18 is a diagram showing a timing advance command (TAC) MAC CE.

FIG. 18 is a diagram showing a timing advance command (TAC) MAC CE. The eNB may adjust uplink timing per TAG with respect to all TAGs configured for the UE using a TAC MAC CE. The TAC MAC CE includes a TAG identity (ID) field and a TAC field.

TAG: Indicates a TAG. TAG ID=0 in the case of a TAG including a PCell.

TAC: Indicates the amount of timing to be adjusted by the UE. This has 6 bits and indicates values of 0 to 63. For a detailed description thereof, refer to FIG. 9.

Figure 19:
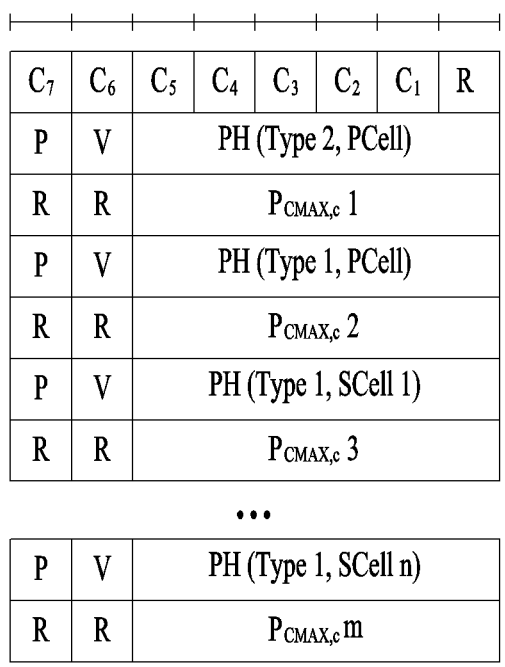
FIG. 19 is a diagram showing a power headroom report (PHR) MAC CE.

FIG. 19 is a diagram showing a power headroom report (PHR) MAC CE. FIG. 19 shows an extended PH MAC CE and may notify the UE of a PH for aggregated all cells. The field of the PH MAC CE will now be described.

$C_i$: Indicates whether a PH field for an SCell having ScellIndex i is present. The $C_i$ field is set to 1 if the PH field for the SCell having ScellIndex i is reported and, otherwise, is set to 0.

R: Reserved bit. This is set to 0.

V: Indicates whether the PH value is based on actual transmission or reference format.

PH: Indicates a power headroom level.

P: Indicates whether the UE applies power backoff for power management.

$P_{CMAC,c}$: Indicates information about per-cell maximum power used to calculate the value of the above-described PH field.

Embodiment: Signaling in inter-site CA

In LTE-A, assume that aggregation (that is, CA) of a plurality of cells is supported and a plurality of cells aggregated for one UE is managed by one eNB (intra-site CA). In intra-site CA, since all cells are managed by one eNB, signaling related to various RRC configurations/reports and MAC commands/messages may be performed via any one of all aggregated cells. For example, signaling involved in a procedure of adding or releasing a specific SCell to or from a CA cell set, a procedure of changing a transmission mode (TM) of a specific cell, a procedure of performing radio resource management (RRM) measurement reporting associated with a specific cell, etc. may be performed via any cell of the CA cell set. As another example, signaling involved in a procedure of activating/deactivating a specific SCell, a buffer status report for UL buffer management, etc. may be performed via any cell of the CA cell set. As another example, a per-cell power headroom report (PHR) for UL power control, a per-timing advanced group (TAG) timing advance command (TAC) for UL synchronization control, etc. may be signaled via any cell of the CA cell set.

Meanwhile, in a next-generation system subsequent to LTE-A, a plurality of cells (e.g., micro cells) having small coverage may be deployed in a cell (e.g., a macro cell) having large coverage, for traffic optimization. For example, a macro cell and a micro cell may be aggregated for one UE, the macro cell may be mainly used for mobility management (e.g., PCell) and the micro cell may be mainly used for throughput boosting (e.g., SCell). In this case, the cells aggregated for one UE may have different coverages and may be respectively managed by different eNBs (or nodes (e.g., relays) corresponding thereto) which are geographically separated from each other (inter-site CA).

Figure 20:
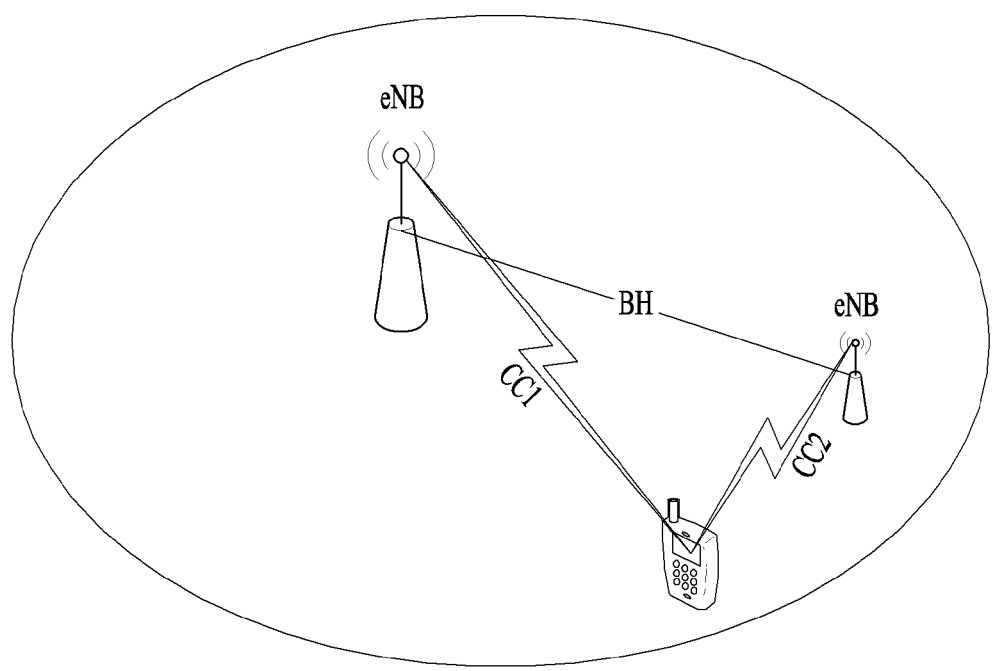
FIG. 20 is a diagram showing inter-site carrier aggregation (CA).

FIG. 20 is a diagram showing inter-site carrier aggregation (CA). Referring to FIG. 20, a method for performing radio resource control and management for a UE (e.g., all functions of RRC and some functions of MAC) at an eNB for managing a PCell (e.g., CC1) and performing data scheduling and feedback with respect to each cell (that is, CC1 or CC2) (e.g., all functions of PHY and main functions of MAC) at each eNB for managing each cell may be considered. Accordingly, in inter-site CA, information/data exchange/delivery between cells (that is, between eNBs) is required. Upon considering a conventional signaling method, in inter-site CA, information/data exchange/delivery between cells (that is, between eNBs) may be performed via a backhaul (BH) link (e.g., a wired X2 interface or a wireless backhaul link). However, when the conventional method is applied without change, cell management stability, resource control efficiency and data transmission adaptation, etc. may be considerably reduced due to latency caused in an inter-eNB signaling procedure.

For example, as shown in FIG. 20, an inter-site CA situation in which a PCell (e.g., CC1) and an SCell (e.g., CC2) aggregated for one UE are respectively managed by eNB-1 and eNB-2 is assumed. In addition, assume that the eNB (that is, eNB-1) for managing the PCell is responsible for managing/performing an RRC function associated with the UE corresponding thereto. At this time, if a radio resource management (RRM) measurement (e.g., reference signal received power (RSRP), reference signal received quality (RSRQ)) report associated with the SCell is not transmitted by the PCell but is transmitted via the SCell (e.g., a PUSCH), eNB-2 may deliver the RRM measurement report to eNB-1 via the BH. In addition, based on the RRM report, for example, if eNB-1 sends an RRC reconfiguration command for releasing the SCell from the CA cell set to the UE via the PCell (e.g., a PDSCH), the UE may transmit a confirmation response to the RRC reconfiguration command via the SCell (e.g., a PUSCH) instead of the PCell. In this case, eNB-2 may deliver the confirmation response to eNB-1 via the BH, etc. Accordingly, in inter-site CA, considerable latency may be caused in an inter-cell (that is, inter-eNB) signaling procedure. Thus, misalignment between the eNB and the UE for CA cell set interpretation may occur and stable/efficient cell resource management and control may not be facilitated.

As another example, in the same inter-site CA situation, per-cell PHRs of all cells may be transmitted via the PCell (e.g., the PUSCH). In this case, eNB-1 (for managing the PCell) may deliver the PHR corresponding to all PHRs or a PHR corresponding to the SCell to eNB-2 (for managing the SCell) via the BH, etc. In contrast, if per-cell PHRs of all cells are transmitted via the SCell, eNB-2 may deliver all PHRs or a PHR corresponding to the PCell to eNB-1 via the BH, etc. Even at this time, stable/efficient UL power control and adaptive UL data scheduling/transmission based thereon may not be facilitated due to latency caused by inter-eNB signaling.

In order to solve the above-described problems, in an inter-site CA situation or a CA situation similar thereto, configuring of a path in which specific signaling (e.g., RRC, MAC, DCI, UCI) associated with a specific cell may be performed (e.g., a cell or cell group in which a transmission/reception operation for signaling may be performed) is proposed. For example, a path (e.g., a cell or cell group) in which a signal/channel transmission and/or reception operation involved in specific signaling associated with a specific cell may be performed may be configured. In this case, the UE may operate in a state in which the signal/channel involved in specific signaling associated with the specific cell may be transmitted and/or received only through the configured path. For example, the procedure of receiving/detecting/monitoring/decoding and/or transmitting/encoding the signal/channel involved in specific signaling associated with the specific cell is performed only on the configured path and may be omitted on the other paths. In the present invention, the specific cell includes a cell or a cell group. A plurality of aggregated cells may be divided into one or more cell groups. Here, each cell group is composed of one or more cells. For convenience, a cell group, to which a PCell belongs, is referred to as a PCell group and a cell group including SCells only is referred to as an SCell group. The number of PCell groups may be one and the number of SCell groups may be 0 or one or more. In the present specification, unless stated otherwise, the PDCCH may include an L-PDCCH and an E-PDCCH.

A signaling method/path proposed by the present invention is applicable to only an inter-site CA situation or a CA situation similar thereto. That is, the signaling method/path proposed by the present invention is not applied but a conventional signaling/path is applied to an intra-CA situation. Accordingly, an eNB may notify a UE of configuration information of a signaling method/path via an RRC message, etc. Meanwhile, the eNB may consider a CA mode (that is, inter-site CA or intra-site CA) in order to configure the signaling method/path. However, the UE needs to know the applied signaling method/path only. Accordingly, the eNB may not notify the UE of a CA mode but notify the UE of information indicating the signaling method/path applied to the UE only. Since the UE can know the signaling method/path applied thereto from the CA mode, the eNB may not separately notify the UE of the information indicating the signaling method/path.

In the present invention, signaling subjected to path configuration may include the following.

Command/response involved in an RRC configuration/reconfiguration (e.g., SCell allocation/release, per-cell TM configuration, per-cell CSI feedback mode/SRS parameter configuration) procedure Radio link monitoring (RLM) (e.g., radio link failure (RLF)) and RRM measurement (e.g., RSRP, RSRQ) related configuration/report handover (HO) related command response MAC activation/deactivation (that is, SCell Act/De) message for SCell

PHR, BSR, TAC

DCI (e.g., DL/UL grant), scheduling request (SR)
Periodic CSI (p-CSI) report, aperiodic CSI (a-CSI) request/report
ACK/NACK (A/N) feedback to DL data reception
Random Access response (RAR), PDCCH for scheduling a PDSCH carrying an RAR (hereinafter, RAR-PDCCH)

As a path configuration example according to signaling, a path for signaling involved in an RRC reconfiguration procedure of additionally allocating/releasing a specific cell to or from a CA cell set and an RRM measurement (e.g., RSRP, RSRQ) report associated with a specific cell may be configured to a PCell group. In this case, signaling involved in an RRC reconfiguration/measurement report associated with a specific cell may be transmitted and received via the PCell group (a PDSCH/PUSCH of an arbitrary cell belonging thereto) only. In addition, a path in which a per-cell PHR for UL power control of a specific cell group (all cells belonging thereto) may be signaled may be configured to the specific cell group. That is, a PHR for a specific cell group may be transmitted via the specific cell group (a PUSCH of an arbitrary cell belonging thereto) only.

Figure 21:
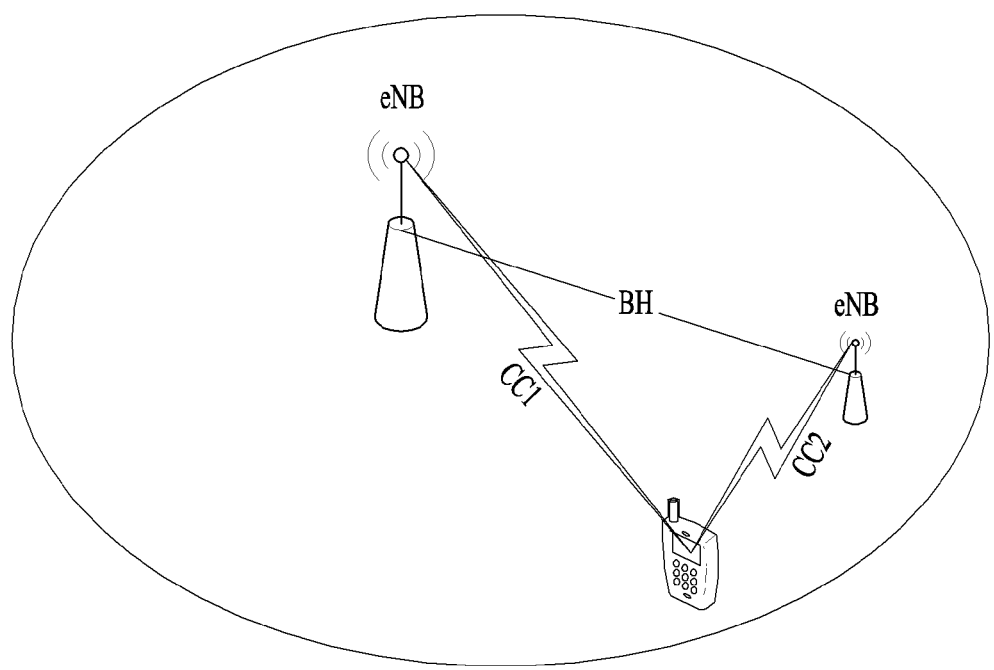
FIG. 21 is a diagram showing a signaling method/path according to one embodiment of the present invention.

FIG. 21 is a diagram showing a signaling method according to one embodiment of the present invention. Referring to FIG. 21, a path in which signaling associated with a specific cell in the situation shown in FIG. 20 is performed may be restricted to CC1 (group) or CC2 (group) according to signaling type. More specifically, in the present invention, a path configuration method according to signaling type includes the following.

Case #1
Signaling type: Command/response involved in an RRC configuration/reconfiguration (e.g., SCell allocation/release, per-cell TM configuration, per-cell CSI feedback mode/SRS parameter configuration) procedure, RLM (e.g., RLF) and RRM measurement (e.g., RSRP, RSRQ) related configuration/report, handover (HO) related command/response
Signaling for a specific cell (or a specific cell group): A path may be configured to a PCell group.

Case #2
Signaling type: MAC activation/deactivation message (that is, SCell Act/De) for SCell, PHR, BSR, TAC, DCI (e.g., DL/UL grant), aperiodic CSI (a-CSI) request/report
Signaling for a specific cell (or a specific cell group): A path may be configured to a cell group, to which the specific cell belongs, (or the specific cell group). In this case, signaling may be restricted as follows.
A cell list to be activated/deactivated in SCell Act/De may be composed of SCells belonging to the specific cell group only.
A PHR may be composed of a per-cell PHR belonging to the specific cell group only. In addition, an independent PHR transmission period may be configured per cell group.
A BSR may report a UL buffer status of the specific cell group (all cells belonging thereto) only.
A TAC may be composed of per-TAG TACs belonging to the specific cell group only. In addition, cells belonging to different cell groups may not belong to the same TAG.
DCI may be scheduling/control information (e.g., DL/UL grant) of cell(s) belonging to the specific cell group. In addition, cross-CC scheduling may not be allowed between cells belonging to different cell groups (that is, DCI (e.g., DL/UL grant)) for a cell belonging to a specific cell group may be configured not to be transmitted from a cell belonging to another cell group).
An a-CSI request/report may be an a-CSI request/report targeted to cell(s) belonging to the specific cell group. In addition, an a-CSI report target cell set designated via RRC signaling may be independently configured per cell group (that is, an a-CSI report target cell set, to which a-CSI request/report is applied, in a specific cell group may be composed of cell(s) belonging to the specific cell group only). In detail, the number of bits configuring the a-CSI request field in DCI may be independently configured according to the number of cells belonging to the cell group (scheduled from the DCI) (for example, to 1 bit if the number of cells is 1 and to 2 bits if the number of cells is 2 or more). As another method, in order to reduce RRC signaling overhead, the a-CSI request field in DCI (scheduling the SCell group) is fixed to 1 bit with respect to (all or a specific) SCell group, and an a-CSI report only for an individual cell may be performed via a respective cell.

Case #3
Signaling type: ACK/NACK (A/N) for DL data, scheduling request (SR), periodic CSI (p-CSI) report
Signaling for a cell belonging to a PCell group: If signaling information is transmitted via a PUCCH, a path may be configured to a PCell. If signaling information is transmitted via a PUSCH (that is, piggybacked on PUSCH (multiplexed with UL data)), a path may be configured to a PCell group (that is a PUSCH transmission cell in a PCell group).
Signaling for a specific SCell belonging to an SCell group: If signaling information is transmitted via a PUCCH, a path may be configured to the specific SCell or a specific SCell designated in the SCell group. (Here, in the designated specific SCell, for example, one of cell(s) configured to perform PDCCH (e.g., DL/UL grant) transmission or (DL/UL data) scheduling in the SCell group is configured (via signaling) or a cell having a specific (for example, smallest) index or specific (e.g., largest) system bandwidth among cell(s) (here, cell(s) in which UL resource/carrier is defined) may be automatically determined). If signaling information is transmitted via a PUSCH (that is, piggybacked on PUSCH (multiplexed with UL data)), a path may be configured to the SCell group, to which the specific SCell belongs. In this case, signaling may be restricted as follows.
A/N transmitted via a PUCCH of an SCell belonging to an SCell group may be composed of an individual A/N response to DL data reception in the SCell only. Unlike the PCell, since SCell activation/deactivation is possible, if the PUCCH is transmitted via a predefined SCell in the SCell group, a predefined SCell may be deactivated when A/N transmission is necessary. Accordingly, (in the case of the SCell group), A/N for the SCell, which has received DL data, may be transmitted via the SCell only. As another method, in order to reduce RRC signaling overhead due to explicit PUCCH resource usage and allocation and increase implicit PUCCH resource usage efficiency, A/N for DL data reception in the specific SCell (belonging to the SCell group) may be defined/set to be transmitted via a cell to which a DL grant PDCCH scheduling the DL data is transmitted.

In addition, A/N piggybacked on a PUSCH of a specific SCell belonging to the SCell group may be composed of an A/N response to DL data reception in all cells of the SCell group.

An SR transmitted via a PUCCH of a specific SCell belonging to the SCell group may be a UL scheduling request targeted to the SCell group (all cells belonging thereto).

p-CSI transmitted via a PUCCH of a specific SCell belonging to the SCell group may be restricted to p-CSI for the specific SCell. In addition, p-CSI piggybacked on the PUSCH of the specific SCell belonging to the SCell group may be composed of p-CSI(s) for one or more cells in the SCell group.

Case #4

Signaling type: RAR, RAR-PDCCH

Signaling for PRACH transmission in a cell belonging to a PCell group: A path of an RAR may be configured to a PCell and a path of an RAR-PDCCH may be configured to a common search space of the PCell.

Signaling for PRACH transmission in a specific SCell belonging to an SCell group: A path of an RAR may be configured to the specific SCell or a specific SCell designated in the SCell group. A path of an RAR-PDCCH may be a common search space of the specific SCell or a specific SCell designated in the SCell group (here, in the case of the designated specific SCell, for example, one of cell(s) configured to perform PDCCH (e.g., DL/UL grant) transmission or (DL/UL data) scheduling in the SCell group is configured (via signaling) or a cell having a specific (for example, smallest) index or specific (e.g., largest) system bandwidth among cell(s) (here, cell(s) in which UL resource/carrier is defined) may be automatically determined).

Meanwhile, unlike the above examples, case #1 is applicable to SCell Act/De. In this case, a path in which MAC signaling related with activation/deactivation of a specific SCell is performed may be configured to a PCell group.

In order to avoid simultaneous transmission of a plurality of PUCCHs, in case #3, the PUCCH transmitted via the SCell may be replaced with a PUSCH resource (hereinafter, a UCI-PUSCH resource) or a DMRS for PUSCH demodulation (hereinafter, UCI-DMRS). UCI-PUSCH resources may be allocated for UCI transmission only (not for UL data transmission). The UCI-PUSCH resource may include a PUSCH resource composed of one subframe (hereinafter, a normal PUSCH resource), a PUSCH resource composed of one slot (hereinafter, a slot PUSCH resource) or a PUSCH resource composed of a small number of SC-FDMA symbols (hereinafter, a shortened PUSCH resource). The shortened PUSCH resource may be composed of N (e.g., N=2 or 3) SC-FDMA symbols per slot, for example. In this case, in each slot, one or two SC-FDMA symbols may be used as DMRS transmission symbol and the remaining one or two SC-FDMA symbols may be used as UCI transmission symbol. In addition, the shortened PUSCH resource composed of one slot may be used as a UCI-PUSCH resource. Accordingly, a plurality of shortened PUSCH resources may be multiplexed (using a TDM scheme) in one UL resource block (RB) (pair).

Accordingly, the UCI-PUSCH resource may be identified by a UL RB index, a slot index (in a UL RB), an SC-FDMA symbol index, a CS and/or OCC (combination) index of a DMRS, etc. Although not limited thereto, individual UCI-PUSCH resources may be respectively allocated to A/N, SR and p-CSI; one common UCI-PUSCH resource may be allocated to all UCI; or one UCI-PUSCH resource may be allocated to two UCIs (e.g., A/N and SR) and one UCI-PUSCH resource may be allocated to the remaining one UCI (e.g., p-CSI). Here, the UCI-PUSCH resource may be allocated in advance via RRC signaling. In addition, a plurality of UCI-PUSCH resources may be allocated in advance via RRC signaling, etc. and a specific UCI-PUSCH resource of the plurality of UCI-PUSCH resources may be indicated via a DL grant PDCCH. More specifically, UCI-PUSCH resources may be indicated via a specific field (e.g., an A/N resource indicator (ARI) field) of a DL grant PDCCH. In addition, the UCI-PUSCH resource linked to a specific DL RB index (e.g., a lowest DL RB index) occupied by DL data may be allocated (in a state in which linkage between the downlink resource block (DL RB) resource and the UCI-PUSCH resource is designated/set). In addition, the UCI-PUSCH resource linked to a specific CCE index (e.g., a lowest CCE index) constituting a PDCCH scheduling DL data may be allocated (in a state in which linkage between the CCE resource and the UCI-PUSCH resource is designated/set).

Next, a UCI-DMRS resource may be composed of M (e.g., M=1, 2, 3) SC-FDMA symbols per slot. Unlike the shortened PUSCH resource, the M symbols of the UCI-DMRS resource may all be used as DMRS transmission symbols. In addition, a UCI-DMRS resource composed of one slot may be used for UCI transmission and thus a plurality of UCI-DMRS resources may be multiplexed (using a TDM scheme) in one UL RB (pair). A UCI transmission method using the UCI-DMRS resource may include 1) a method for selecting/transmitting different UCI-DMRS resources according to UCI value (e.g., ACK or NACK, positive or negative SR) (among a plurality of UCI-DMRS resources) and 2) a method for transmitting a DMRS symbol modulated (e.g., BPSK, QPSK) according to a UCI value on a UCI-DMRS resource (and/or a combination of 1) and 2)). In method 2), a specific DMRS symbol (e.g., a first DMRS symbol) in the UCI-DMRS resource may be fixed without modulation (thus, a receiver (eNB) may receive UCI information via detection of a signal difference (e.g., a phase difference) between a fixed DMRS symbol and a modulated DMRS symbol (similarly to existing PUCCH format 2a/2b for simultaneously transmitting CQI and A/N via differential modulation of a DMRS).

The UCI-DMRS resource may be identified by a UL RB index, a slot index (in a UL RB), an SC-FDMA symbol index, a CS and/or OCC (combination) index, etc. Individual or common UCI-DMRS resources may be allocated to A/N and SR only and UCI-PUSCH resources may be allocated to p-CSI. The UCI-DMRS may be allocated in advance via RRC signaling, etc., or which UCI-DMRS resource is used may be signaled via a PDCCH (e.g., an ARI field in a PDCCH) in a state of allocating a plurality of UCI-DMRS resources in advance via RRC signaling or a UCI-DMRS resource linked to a specific CCE index (e.g., a lowest CCE index) configuring a PDCCH scheduling DL data or a specific DL RB index (e.g., a lowest DL RB index) occupied by DL data (in a state in which linkage between the DL RB resource and the UCI-DMRS resource or between the CCE resource and the UCI-DMRS resource is designated/set) may be allocated.

The signaling path configuring method of the present invention is not limited to the above-described signaling types. For example, the signaling path configuring method of the present invention is applicable to other signaling related to RRC/MAC/DCI/UCI. For example, case #1 is applicable to signaling associated with an RRC layer, case

2 is applicable to signaling associated with a MAC layer and case #3 is applicable to signaling associated with DCI/UCI.

Meanwhile, a cell group may be differently designated/set according to signaling or signaling set (that is, an independent cell group may be designated/configured according to signaling or signaling set). The signaling path configuring method of the present invention is applicable in a state in which cells having different frame structure types (e.g., FDD or TDD) or cells having different CP lengths (e.g., normal CP or extended CP) are designated/set to belong to different cell group. In this case, if a cell group is designated (without a separate signaling path configuring procedure), the signaling path configuring methods (case #1, #2, #3 and #4) of the present invention may be automatically applied.

As another method, a method for configuring a cell via which signaling associated with/related to/corresponding to a corresponding cell (signal/channel transmission and/or reception operation involved therein) may be performed (without separately designating/setting a cell group) may be considered for each cell. For example, in the above-described signaling, the following per-cell path configuring may be possible.

RRC Configuration/Reconfiguration
For each cell, a cell, via which command/response transmission involved in an RRC configuration/reconfiguration procedure (such as SCell allocation/release, per-cell TM configuration, per-cell CSI feedback mode/SRS parameter configuration, etc.) of the corresponding cell will be performed, may be configured.

RRM Measurement
For each cell, a cell, via which RRM measurement related configuration/report transmission (such as RSRP, RSRQ, etc.) of the corresponding cell will be performed, may be configured.

RLM/HO
A cell, via which RLM related configuration/report and HO related command/response transmission will be performed, may be configured.

SCell Activation/Deactivation
For each cell, a cell, via which activation/deactivation message transmission of the corresponding cell will be performed, may be configured.

PHR/BSR/TAC
For each cell, a cell, via which PHR, BSR and TAC transmission of the corresponding cell will be performed, may be configured.

DCI
For each cell, a cell, via which DCI transmission (of DL/UL grant, etc.) of the corresponding cell will be performed, may be configured.

SR
For each cell, a cell, via which SR transmission of the corresponding cell will be performed, may be configured.

p-CSI Report
For each cell, a cell, via which p-CSI report transmission of the corresponding cell will be performed, may be configured.

a-CSI Request/Report
For each cell, a cell, via which a-CSI request/report transmission of the corresponding cell will be performed, may be configured.

ACK/NACK
For each cell, a cell, via which A/N feedback transmission for DL data received via the corresponding cell will be performed, may be configured.

RAR And RAR-PDCCH
For each cell, a cell, via which RAR and RAR-PDCCH transmission corresponding to PRACH transmission of the corresponding cell will be performed, may be configured.

As another method, in the case of HARQ-ACK for DL data, information about a cell and/or subframe via which HARQ-ACK transmission will be performed may be indicated using DL grant DCI scheduling DL data in consideration of coordination between cells (eNBs) for PUCCH and/or UCI transmission. More specifically, in a state of predefining/designating a plurality (e.g., 2) of cell/subframes (information) in advance, one of a plurality of cells/subframes via which HARQ-ACK transmission for DL data will be performed may be indicated using DL grant DCI. The plurality of cells may be defined/designated as the PCell and the cell via which DL grant DCI (or DL data) is transmitted. The plurality of subframes may be defined/designated as a HARQ-ACK transmission subframe (that is, an original A/N SF) corresponding to DL grant DCI (or DL data) reception subframes (determined based on original HARQ-ACK timing defined in a legacy (e.g., Rel-10/11) FDD/TDD system) and an earliest UL SF (defined by HARQ timing) after the original A/N SF.

Similarly, even in the case of a PHICH for UL data, information about a cell and/or subframe via which PHICH transmission will be performed may be indicated using UL grant DCI scheduling UL data in consideration coordination between cells (eNBs) for DL control resource transmission. More specifically, in a state of predefining/designating a plurality (e.g., 2) of cell/subframes (information) in advance, one of a plurality of cells/subframes via which PHICH transmission for UL data will be performed may be indicated using UL grant DCI. The plurality of cells may be defined/designated as the PCell and the cells via which UL grant DCI (or UL data) is transmitted. The plurality of subframes may be defined/designated as a PHICH transmission subframes (that is, original PHICH SF) corresponding to UL grant DCI (or UL data) reception subframe (determined based on PHICH timing) and an earliest DL (or special) SF (defined by PHICH timing) after the original PHICH SF.

Meanwhile, a backhaul link deployed for the purpose of exchange/delivery of (UE related) information/data between cells (sites/eNBs for managing/controlling the same) aggregated for one UE may be composed of non-ideal backhauls having significant latency. If cells (sites/eNBs managing/controlling the same) directly perform exchange/delivery of all information/data via the backhaul link in a non-ideal backhaul based CA situation, significant load/latency may occur on the backhaul link. In order to solve this problem, it is proposed that information exchange/delivery between cells is performed via the UE with respect to a specific/predetermined part of cell information in consideration of load/latency on the backhaul link and a radio channel status of the UE. That is, the backhaul link between cells (sites/eNBs) may be replaced with a radio link between the cell and the UE. More specifically, information exchange/delivery between cells aggregated for the UE may be performed as follows via the radio link. For convenience, as shown in FIG. 21, assume that information related to a cell 1 is delivered to a cell 2 via the UE in a state in which the cell 1 (e.g., CC1) and the cell 2 (e.g., CC2) are aggregated for the UE.

Alt 1: Cell 1 Command

The cell 1 may command/instruct the UE to deliver/report cell 1-related specific information to the cell 2 (via a specific DL channel/signal transmitted on the cell 1).

The UE may deliver/report the cell 1-related specific information to the cell 2 (via a specific UL channel/signal transmitted on the cell 2) according to the command/instruction of the cell 1.

Alt 2: UE Report

The UE may directly deliver/report the cell 1-related specific information to the cell (via a specific UL channel/signal transmitted on the cell 2) at a specific time or at a specific period.

The specific time may be a time when the cell 1-related specific information is reconfigured/changed (or an appropriate time thereafter).

The specific period may be configured via L1/L2/RRC signaling from the cell 1 or the cell 2.

Alt 3: Cell 2 Request

The cell 2 may request/instruct the UE to deliver/report the cell 1-related specific information to the cell 2 (via a specific DL channel/signal transmitted on the cell 2).

The UE may deliver/report the cell 1-related specific information to the cell 2 (via a specific UL channel/signal transmitted over on cell 2) according to the request/instruction of the cell 2.

The cell-related specific information subjected to the above-described inter-cell information signaling method may include at least a TM configured with respect to the corresponding cell, a CSI feedback mode, an SRS related parameter, an activation/deactivation state of the corresponding cell, TA applied to the corresponding cell, etc. More specifically, in the case of Alt 1, the cell 1 may command/instruct the UE to deliver/report SRS related parameter information configured in the cell 1 (that is, configured in the cell 1 with respect to the corresponding UE) to the cell 2. Thus, the UE may deliver/report the SRS related parameter information configured in the cell 1 to the cell 2. In the case of Alt 2, the UE may directly deliver/report TA information applied to the cell 1 to the cell 2 when TA applied to the cell 1 (that is, TA information applied to the UE in the cell 1) is reconfigured/changed (or at an appropriate time thereafter). In the case of Alt 3, the cell 2 may request/instruct the UE to deliver/report activation/deactivation state information of the cell 1 (that is, activation/deactivation applied to the cell 1 with respect to the UE) to the cell 2. Then, the UE may deliver/report the activation/deactivation information of the cell 1 to the cell 2.

Meanwhile, in non-ideal backhaul based inter-site CA (or inter-eNB CA), [PCell, SCell]=[cell 1, cell 2] may be determined/set with respect to the UE 1 and [PCell, SCell]=[cell 2, cell 1] may be determined/set with respect to the UE 2. In addition, UE #3 may perform communication (that is, signal/channel transmission and reception) only via one cell (that is, the cell 1 or the cell 2). In this state, the eNB 1 may allocate a C-RNTI A to the UE 1 which uses/operates the cell 1, which is managed/controlled by the eNB 1, as the PCell and eNB 2 may allocate a C-RNTI B to the UE 2 which uses/operates the cell 2, which is managed/controlled by the eNB 1, as the PCell. In addition, the cell 2 may be further allocated to the UE 1 as the SCell. At this time, when the C-RNTI A and the C-RNTI B have the same value, ambiguity may occur between the signal/channel of the UE 1 and the signal/channel of the UE 2 over the cell 2 such that the transmission and reception operation may not be normally performed. In this case, although the RNTI allocable to the UE may be distributed per eNB (cell) in advance or information exchange between eNBs may be performed in order to allocate RNTIs to UEs, this increases load/latency on the backhaul and deteriorate RNTI allocation efficiency.

Accordingly, in order to solve this problem, allocation/use of an independent (same or different) RNTI to one UE per (aggregated) cell is proposed. For example, one UE for which the cell 1 and the cell 2 are aggregated may perform signal/channel transmission and reception using the C-RNTI A with respect to the cell 1 and perform signal/channel transmission and reception using the C-RNTI B with respect to the cell 2. At this time, the C-RNTI A and the C-RNTI B may have the same value or different values. In addition, the UE may notify the cell 2 of the C-RNTI A information allocated/used to/by the cell 1 and notify the cell 1 of the C-RNTI B information allocated/used to/by the cell 2. Here, the cell 1 and the cell 2 may be extended to a cell group 1 and a cell group 2, respectively, and an independent RNTI may be allocated/used per cell group. The cell group may be composed of one or more cells and one RNTI may be allocated/used to/by all cells belonging to one cell group. Meanwhile, the RNTI allocated/used per cell may include at least one of a system information-RNTI (SI-RNTI), paging RNTI (P-RNTI), a random access RNTI (RA-RNTI), a cell RNTI (C-RNTI), a semi-persistent scheduling cell RNTI (SPS C-RNTI), a temporary C-RNTI, a transmit power control-PUCCH-RNTI (TPC-PUCCH-RNTI), a TPC-PUSCH-RNTI and a MBMS RNTI (M-RNTI) and may preferably include a C-RNTI. The cell group may be equally or differently configured per RNTI.

Figure 22:
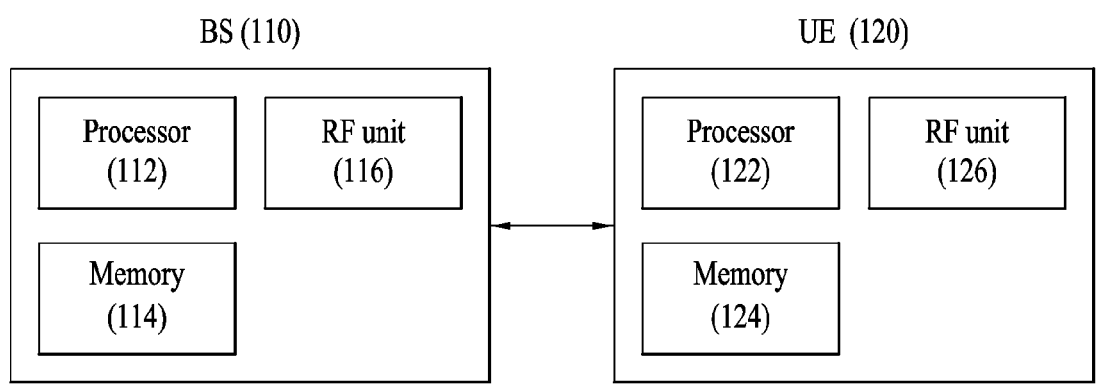
FIG. 22 is a diagram showing a base station (BS) and a user equipment (UE) to which the present invention is applicable.

FIG. 22 is a diagram showing a base station (BS) and a user equipment (UE) to which the present invention is applicable.

Referring to FIG. 22, a wireless communication system includes a base station (BS) 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 so as to store a variety of information associated with operation of the processor 112. The RF unit 116 is connected to the processor 112 so as to transmit and/or receive an RF signal. The UE 120 includes a processor 122, a memory 124 and an RF unit 126. The processor 122 may be configured to implement the procedures and/or methods proposed by the present invention. The memory 124 is connected to the processor 122 so as to store a variety of information associated with the operation of the processor 122. The RF unit 126 is connected to the processor 122 so as to transmit and/or receive an RF signal. The BS 110 and/or the UE 120 may have a single antenna or multiple antennas.

The above-described embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a user equipment and a base station. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "terminal" may also be replaced with the term User Equipment (UE), subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. Software code may be stored in a memory unit so as to be executed by a processor. The memory unit may be located inside or outside of the processor, so that it can communicate with the aforementioned processor via a variety of well-known parts. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention is applicable to a wireless communication apparatus such as a UE, a relay and a base station.

What is claimed is:

1. A method for transmitting a buffer status report at a user equipment (UE) in a wireless communication system, the method comprising:

configuring a first cell group having a primary cell (PCell);

configuring a second cell group having one or more secondary cells (SCells); and transmitting the buffer status report, wherein, if the first cell group and the second cell group are managed by a same base station, the first buffer status report indicates uplink buffer status regarding the first and second cell groups, and wherein, if the first cell group and the second cell group are managed by different base stations, the buffer status report indicates uplink buffer status regarding only one of the first cell group and the second cell group.

2. The method of claim 1, wherein if the first cell group and the second cell group are managed by the different base stations, the buffer status report is transmitted only in a corresponding cell group.

3. The method of claim 1, wherein if the first cell group and the second cell group are managed by the different base stations, radio resource control (RRC) of the UE is managed only by a base station of the first cell group.

4. The method of claim 1, wherein if the first cell group and the second cell group are managed by the different base stations, mobility management of the UE is managed only by a base station of the first cell group.

5. A User Equipment (UE) for transmitting a buffer status report in a wireless communication system, the UE comprising:

a Radio Frequency (RF) unit; and a processor, wherein the processor is configured to configure a first cell group having a primary cell (PCell), to configure a second cell group having one or more secondary cells (SCells), and to transmit the buffer status report, wherein, if the first cell group and the second cell group are managed by a same base station, the buffer status report indicates uplink buffer status regarding the first and second cell groups, and wherein, if the first cell group and the second cell group are managed by different base stations, the buffer status report indicates uplink buffer status regarding only one of the first cell group and the second cell group.

6. The UE of claim 5, wherein if the first cell group and the second cell group are managed by the different base stations, the buffer status report is transmitted only in a corresponding cell group.

7. The UE of claim 5, wherein if the first cell group and the second cell group are managed by the different base stations, radio resource control (RRC) of the UE is managed only by a base station of the first cell group.

8. The UE of claim 5, wherein if the first cell group and the second cell group are managed by the different base stations, mobility management of the UE is managed only by a base station of the first cell group.

* * * * *